(12) United States Patent
Iwazumi et al.

(10) Patent No.: US 8,586,694 B2
(45) Date of Patent: Nov. 19, 2013

(54) POLYMERIZATION CATALYST FOR POLYTHIOURETHANE-BASED OPTICAL MATERIAL, POLYMERIZABLE COMPOSITION CONTAINING THE CATALYST, OPTICAL MATERIAL OBTAINED FROM THE COMPOSITION, AND METHOD FOR PREPARING THE OPTICAL MATERIAL

(75) Inventors: Masanori Iwazumi, Irvine, CA (US); Nobuo Kawato, Kurume (JP); Mamoru Tanaka, Fukuoka (JP); Hidetoshi Hayashi, Omuta (JP); Seiichi Kobayashi, Omuta (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 93 days.

(21) Appl. No.: 12/528,369

(22) PCT Filed: Feb. 4, 2008

(86) PCT No.: PCT/JP2008/000136
§ 371 (c)(1),
(2), (4) Date: Aug. 24, 2009

(87) PCT Pub. No.: WO2008/105138
PCT Pub. Date: Sep. 4, 2008

(65) Prior Publication Data
US 2010/0016517 A1   Jan. 21, 2010

(30) Foreign Application Priority Data
Feb. 27, 2007 (JP) ................... 2007-047902

(51) Int. Cl.
*C08G 18/00* (2006.01)

(52) U.S. Cl.
USPC ............. 528/52; 528/48; 528/71; 528/76; 528/85; 528/373; 528/374; 528/381; 528/388; 528/391; 428/423.1; 252/182.17; 252/182.18; 252/182.2; 252/182.21; 252/182.3

(58) Field of Classification Search
USPC .......... 528/373, 374, 48, 52, 71, 76, 85, 381, 528/388, 391; 428/423.1; 252/182.17, 252/182.18, 182.2, 182.21, 182.3
See application file for complete search history.

(56) References Cited

U.S. PATENT DOCUMENTS 5,693,738 A * 12/1997 Okazaki et al. .......... 528/51
5,854,360 A * 12/1998 Matsunaga et al. .......... 525/452
5,973,098 A   10/1999 Keita et al.
6,130,307 A * 10/2000 Amagai et al. .......... 528/73
6,531,532 B1 * 3/2003 Yoshimura et al. .......... 524/418
2004/0026658 A1 * 2/2004 Yoshimura et al. ...... 252/183.11
2007/0185223 A1 * 8/2007 Ortalda .......... 521/172

FOREIGN PATENT DOCUMENTS

| EP | 1 316 819 A1 | 6/2003 |
|---|---|---|
| EP | 1 326 095 A1 | 7/2003 |
| EP | 1988109 | * 11/2008 |
| JP | 58-59959 A | 4/1983 |
| JP | 62-16484 | 1/1987 |
| JP | 63-77918 A | 4/1988 |
| JP | 3-84021 A | 4/1991 |
| JP | 8-208792 A | 8/1996 |
| JP | 9-77850 | 3/1997 |
| JP | 10-81726 A | 3/1998 |
| JP | 10-182786 A | 7/1998 |
| JP | WO 00/26272 A1 | 5/2000 |
| JP | 2000-256571 A | 9/2000 |
| JP | 2001072739 A * | 3/2001 |
| JP | 2002-528613 A | 9/2002 |
| JP | 2005-105084 A | 4/2005 |
| JP | 2005105084 A * | 4/2005 |
| JP | 2008-74957 A | 4/2008 |
| WO | WO 98/03575 A1 | 1/1998 |
| WO | WO 2005080464 A1 * | 9/2005 |
| WO | WO-2007/097116 * | 8/2007 |
| WO | WO 2008/035457 A1 | 3/2008 |

OTHER PUBLICATIONS

International Search Report (PCT/ISA/210) dated Apr. 4, 2008.
Supplementary European Search Report dated Jun. 13, 2013, issued in corresponding European Patent Application No. 08702868.4.

* cited by examiner

*Primary Examiner* — Michael L Leonard
(74) *Attorney, Agent, or Firm* — Buchanan Ingersoll & Rooney PC

(57) ABSTRACT

The polymerization catalyst for a polythiourethane-based optical material of the present invention includes a sulfonate represented by the following general formula (1). Furthermore, in the formula, $R^1$, $R^2$, $R^3$ and $R^4$ each independently represent an alkyl group having 1 to 18 carbon atoms, $R^1$, $R^2$, $R^3$ and $R^4$ may be bonded to each other to form a ring. $R^5$ represents a hydrogen atom or an alkyl group having 1 to 18 carbon atoms, and X represents a nitrogen atom or a phosphorus atom.

(1)

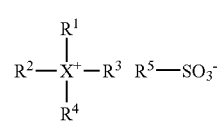

3 Claims, No Drawings

POLYMERIZATION CATALYST FOR POLYTHIOURETHANE-BASED OPTICAL MATERIAL, POLYMERIZABLE COMPOSITION CONTAINING THE CATALYST, OPTICAL MATERIAL OBTAINED FROM THE COMPOSITION, AND METHOD FOR PREPARING THE OPTICAL MATERIAL

TECHNICAL FIELD

The present invention relates to a polymerization catalyst for a polythiourethane-based optical material, a polymerizable composition for a polythiourethane-based optical material including the catalyst, an optical material obtained by polymerization of the composition, and a method for preparing the optical material. The polythiourethane resins obtained by the present invention are used for optical materials such as plastic lenses, prisms, optical fibers, information recording substrates, filters, light emitting diodes, and the like, and in particular, suitably used as plastic lens materials for spectacles.

BACKGROUND ART

In recent years, improving harmony with the global environment and decreasing the environmental burden have become significant goals of the industry and the development of products and technologies has been speeded up out of concern for the environment. There has been a similar movement in the technical field of the present invention, in particular, the regulation of the use of an organotin compound has been strengthened among developed countries, since it has become a problem that the organotin catalyst, which is widely used as a catalyst for a polyurethane resin, is harmful for human bodies due to its high toxicity, environmental hormones, and the like. In the spectacle lens industry which uses this polythiourethane resin, there is a need for the development of a catalyst to replace the organotin catalyst. As for tin-free non-metal catalysts capable of giving common thermocurable resins, an amine compound, an amine carboxylate, phosphine, and the like are known (Patent Documents 1, 2, 3, 4 and 5). In addition, a quaternary ammonium salt compound is known to be used in combination with a carboxylic acid metal compound (Patent Document 6).

Furthermore, to prepare a polythiourethane resin as a material for a plastic lens, a casting polymerization method in which a polymerizable composition is injected into a mold for heat curing is generally employed. In this method, the polymerization reaction is carried out while the temperature is gradually raised from a low temperature to a high temperature over a period of several hours to several tens of hours. At that time, in order to obtain an optically homogeneous plastic lens, it is necessary to add a catalyst to slowly carry out a heat controlled polythiourethanization reaction, thereby preventing the occurrence of thermal inhomogeneity while the temperature is raised. Furthermore, in order to fully realize the physical properties of the resin including its optical properties, heat resistance, and strength, it is necessary to complete the polymerization. In order to complete the polymerization, a method in which a catalyst with strong polymerization activity is used, or a method in which the amount of the catalyst is increased might be considered. However, such methods have problems such as the polymerization reaction progresses until the prepared polymerizable composition is injected into a mold, in other words, sufficient pot life cannot be secured. Furthermore, there is another problem that exothermic heat is locally generated during polymerization and then optical inhomogeneity occurs frequently in the lenses. As a method of solving this problem, there have been reports, for example, of a case in which the low-temperature activity is suppressed using a Lewis acid in combination with a tertiary amine with strong activity (Patent Document 6).

However, if a conventionally known non-metal catalyst is used as a catalyst for polythiourethanization, the catalyst activity in the low-temperature zone is too strong, and runaway polymerization occurs. Thus, such a catalyst is not good enough as the catalyst for producing the optical transparent resin for a plastic lens for spectacles, and the like, since sufficient heat resistance may not be obtained and cloudiness is generated in the obtained resin depending on the resins to be cured.

[Patent Document 1] Japanese Patent Laid-open No. H03-084021

[Patent Document 2] Japanese Patent Laid-open No. S63-077918

[Patent Document 3] Japanese Patent Laid-open No. S62-016484

[Patent Document 4] Japanese Patent Laid-open No. H09-077850

[Patent Document 5] Japanese Patent Laid-open No. 2000-256571

[Patent Document 6] Japanese Patent Laid-open No. 2005-105084

DISCLOSURE OF THE INVENTION

The present invention provides a non-metallic polymerization catalyst that does not include a metal compound such as the organotin compound that has been conventionally used as a catalyst for polythiourethane resin, and further, is capable of giving a stable quality to a polythiourethane resin making it suitable for use as an optical transparent resin.

The present inventors have conducted extensive studies in order to solve the above-described problems, and as a result, they have found that a compound in which the anions of a quaternary ammonium salt or a quaternary phosphonium salt are a sulfonic acid group can be stably dissolved in polyiso(thio)cyanates, and can have excellent catalytic activity equivalent to or more than that of an organotin-based catalyst used as a catalyst for the preparation of optical material made from polythiourethane resin prepared from the polyiso(thio)cyanates and active hydrogen compounds. It was demonstrated that if the catalyst of the present invention is used, the increase in the viscosity of a monomer mixture before the monomer mixture is injected into a mold at a low temperature is slow, and accordingly, the pot life can be greatly increased even without cooling the monomer mixture, and furthermore, even in an amount of the catalyst to be added in which the increase in the viscosity in a low-temperature zone is slower than the organotin catalyst, sufficient catalytic activity is exhibited at medium- to high-temperature zones and the polymerization is completed, and the heat resistance of the obtained resin is equivalent to or more than that of the organotin catalyst. They have found that a compound in which the anion group of a quaternary ammonium salt or a quaternary phosphonium salt is a sulfonic acid group can be used as an excellent non-metal catalyst to replace the organotin-based catalyst, thereby completing the present invention.

Specifically, the present invention relates to the following:

[1] a polymerization catalyst for a polythiourethane-based optical material, which contains a sulfonate represented by the general formula (1):

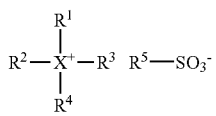
(1)

(In the general formula (1) $R^1$, $R^2$, $R^3$ and $R^4$ each independently represent an alkyl group having 1 to 18 carbon atoms, and $R^1$, $R^2$, $R^3$ and $R^4$ may be bonded to each other to form a ring. $R^5$ represents a hydrogen atom or an alkyl group having 1 to 18 carbon atoms, and X represents a nitrogen atom or a phosphorus atom.).

[2] the polymerization catalyst for a polythiourethane-based optical material as described in [1], which contains a compound represented by the general formula (2):

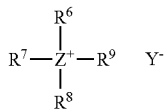
(2)

(In the general formula (2), $R^6$, $R^7$, $R^8$ and $R^9$ each independently represents an alkyl group having 1 to 18 carbon atoms, and $R^6$, $R^7$, $R^8$ and $R^9$ may be bonded to each other to form a ring. Y represents an organic acid group derived from an organic acid selected from carboxylic acid, phosphoric acid ester, and tetraphenyl boron, and a derivative thereof, or an inorganic acid group derived from an inorganic acid selected from hydrohalogen acid, perchloric acid, carbonic acid, mono hydrogen carbonic, phosphoric acid, and boric acid. Z represents a nitrogen atom or a phosphorus atom.).

[3] a polymerization catalyst for a polythiourethane-based optical material, which is obtained by mixing a compound represented by the general formula (2):

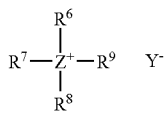
(2)

(In the general formula (2), $R^6$, $R^7$, $R^8$ and $R^9$ each independently represents an alkyl group having 1 to 18 carbon atoms, and $R^6$, $R^7$, $R^8$ and $R^9$ may be bonded to each other to form a ring. Y represents an organic acid group derived from an organic acid selected from carboxylic acid, phosphoric acid ester, and tetraphenyl boron, and a derivative thereof, or an inorganic acid group derived from an inorganic acid selected from hydrohalogen acid, perchloric acid, carbonic acid, mono hydrogen carbonic, phosphoric acid, and boric acid. Z represents a nitrogen atom or a phosphorus atom.), and a compound represented by the general formula (3):

(3)

(In the general formula (3), $R^5$ represents a hydrogen atom or an alkyl group having 1 to 18 carbon atoms.)
at a molar ratio of the compound represented by the general formula (2) to the compound represented by the general formula (3) of 1 or more.

[4] the polymerization catalyst for a polythiourethane-based optical material as described in [1] or [2], wherein the cation part of the compound represented by the general formula (1), which is represented by the general formula (4):

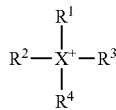
(4)

is one or two or more kinds selected from the group consisting of a tetramethylammonium ion, a tetraethylammonium ion, a tetrapropylammonium ion, a tetrabutylammonium ion, a trioctyl methyl ammonium ion, a tributylbenzylammonium ion, and a tetrabutylphosphonium ion.

[5] the polymerization catalyst for a polythiourethane-based optical material as described in [2] or [3], wherein the cation part of the compound represented by the general formula (2), which is represented by the general formula (5):

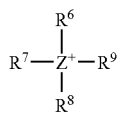
(5)

is one or two or more kinds selected from the group consisting of a tetramethylammonium ion, a tetraethylammonium ion, a tetrapropylammonium ion, a tetrabutylammonium ion, a trioctyl methyl ammonium ion, a tributylbenzylammonium ion, and a tetrabutylphosphonium ion.

[6] the polymerization catalyst for a polythiourethane-based optical material as described in [1] or [2], wherein the anion part of the compound is represented by the general formula (1), represented by the general formula (6):

(6)

is one or two or more kinds selected from the group consisting of a methanesulfonic acid ion, a benzenesulfonic acid ion, a toluenesulfonic acid ion, and a dodecylbenzenesulfonic acid ion.

[7] the polymerization catalyst for a polythiourethane-based optical material as described in [3], wherein the compound represented by the general formula (3) is one or two or more kinds selected from the group consisting of methanesulfonic acid, benzenesulfonic acid, toluenesulfonic acid, and dodecylbenzenesulfonic acid.

[8] the polymerization catalyst for a polythiourethane-based optical material as described in [1] or [2], wherein the compound represented by the general formula (1) is one or two or more kinds selected from the group consisting of tetrabutylammonium methanesulfonate, tetrabutylammonium benzenesulfonate, tetrabutylammonium toluenesulfonate, tetrabutylammonium dodecylbenzenesulfonate, trioctyl methyl ammonium methanesulfonate, trioctyl methyl ammonium benzenesulfonate, trioctyl methyl ammonium toluenesulfonate, and trioctyl methyl ammonium dodecylbenzenesulfonate.

[9] a polymerizable composition for a polythiourethane-based optical material, comprising a monomer mixture including polyiso(thio)cyanates and active hydrogen compounds with a molar ratio of the functional groups of the iso(thio)cyanato groups contained in the polyiso(thio)cyanates to the hydroxyl groups and/or mercapto groups contained in the active hydrogen compounds in a range of 0.5 to 3.0, and the polymerization catalyst for a polythiourethane-based optical material as described in any one of [1] to [8] in a content of 0.0005 parts by weight to 5 parts by weight, based on 100 parts by weight of the monomer mixture.

[10] the polymerizable composition for a polythiourethane-based optical material as described in [9], wherein the polyiso(thio)cyanates are one or two or more kinds selected from the group consisting of m-xylylene diisocyanate, 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane, and hexamethylene diisocyanate, and the active hydrogen compounds are one or two or more kinds selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane, and 2-(2,2-bis(mercaptomethylthio)ethyl)-1,3-dithiethane,

[11] a polythiourethane-based optical material obtained by heat curing the polymerizable composition for a polythiourethane-based optical material as described in [9] or [10] at a temperature of −50 to 200 degrees C. for 1 to 100 hours,

[12] a plastic lens comprising the polythiourethane-based optical material as described in [11], and

[13] a method for preparing a polythiourethane-based optical material comprising:

casting and polymerizing the polymerizable composition for a polythiourethane-based optical material as described in [9] or [10], The catalyst of the present invention is a non-metallic catalyst which has excellent catalytic activity, replacing the organotin catalyst conventionally used as a catalyst for the preparation of polythiourethane-based optical material. The catalyst of the present invention is useful as a novel catalyst to replace the organotin catalyst as the regulations regarding the use of the organotin catalyst have been strengthened in recent years. The catalyst of the present invention allows pot life to be greatly increased even without cooling the monomer mixture, since the activity at a low temperature is particularly low, and the increase in the viscosity of the monomer mixture before the monomer mixture is injected into a mold is slow compared with the organotin catalyst. Furthermore, the polythiourethane resin obtained by using the catalyst of the present invention sufficiently satisfies the physical properties necessary for optical material, and accordingly, the catalyst is useful as an excellent non-metal catalyst to replace the organotin-based catalyst.

BEST MODE FOR CARRYING OUT THE INVENTION

Hereinbelow, the present invention is described in detail.

The present invention relates to a polymerization catalyst for polythiourethane-based optical material.

The sulfonate as used in the present invention refers to a compound represented by the general formula (1):

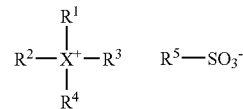

In the general formula (1), $R^1$, $R^2$, $R^3$ and $R^4$ each independently represent an alkyl group having 1 to 18 carbon atoms, $R^1$, $R^2$, $R^3$ and $R^4$ may be bonded to each other to form a ring. $R^5$ is a hydrogen atom or an alkyl group having 1 to 18 carbon atoms, and X represents a nitrogen atom or a phosphorus atom.

$R^1$, $R^2$, $R^3$ and $R^4$ are each an alkyl group having 1 to 18 carbon atoms which may be branched, and may contain an aromatic ring, a hydroxyl group, or an amino group. Preferably, they are each an alkyl group having 1 to 18 carbon atoms, which may be optionally substituted with an aromatic ring, or a hydroxyl group, and more preferably, an alkyl group having 1 to 18 carbon atoms, which may be optionally substituted with an aromatic ring.

Examples of $R^1$, $R^2$, $R^3$ and $R^4$ include a methyl group, an ethyl group, an n-propyl group, an isopropyl group, an n-butyl group, sec-butyl group, an isobutyl group, a tert-butyl group, an n-pentyl group, an n-hexyl group, an n-heptyl group, a sec-heptyl group, a 1-propyl butyl group, an n-octyl group, a 2-ethylhexyl group, a sec-octyl group, an n-nonyl group, a 1-butylpentyl group, an n-decyl group, an n-undecyl group, a 1-pentylhexyl group, an n-dodecyl group, an n-tridecyl group, a 1-hexylheptyl group, an n-tetradecyl group, an n-pentadecyl group, a 1-heptyloctyl group, an n-hexadecyl group, an n-heptadecyl group, a 1-octylnonyl group, an n-octadecyl group, a phenyl group, and a benzyl group. For the compound of the general formula (1), from the viewpoint of the solubility of the polyiso(thio)cyanates or the active hydrogen compounds as described below, the total number of carbon atoms in $R^1$, $R^2$, $R^3$ and $R^4$ is preferably from 8 to 72, and, in order to decrease the additional amount by reducing the molecular weight of the compound of the general formula (1), the total number of carbon atoms in $R^1$, $R^2$, $R^3$ and $R^4$ is more preferably from 8 to 32.

X represents a nitrogen atom or a phosphorus atom, and preferably a nitrogen atom.

The cation part of the compound of the general formula (1) is represented by the general formula (4):

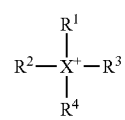

The cation part represented by the general formula (4) is preferably one or two or more kinds selected from the group consisting of a tetramethylammonium ion, a tetraethylammonium ion, a tetrapropylammonium ion, a tetrabutylammonium ion, a trioctyl methyl ammonium ion, a tributylbenzylammonium ion, and a tetrabutylphosphonium ion.

$R^5$ is a hydrogen atom or an alkyl group having 1 to 18 carbon atoms, and may contain an aromatic ring or a hydroxyl group. Preferably, it is an alkyl group having 1 to 18 carbon atoms which may be optionally substituted with an aromatic ring.

Examples of $R^5$ include a methyl group, an ethyl group, an n-propyl group, an isopropyl group, an n-butyl group, a sec-butyl group, an isobutyl group, a tert-butyl group, an n-pentyl group, an n-hexyl group, an n-heptyl group, a sec-heptyl group, a 1-propylbutyl group, an n-octyl group, a 2-ethylhexyl group, a sec-octyl group, an n-nonyl group, a 1-butylpentyl group, an n-decyl group, an n-undecyl group, a 1-pentylhexyl group, an n-dodecyl group, an n-tridecyl group, a 1-hexylheptyl group, an n-tetradecyl group, an n-pentadecyl group, a 1-heptyloctyl group, an n-hexadecyl group, an n-heptadecyl group, a 1-octylnonyl group, an n-octadecyl group, a phenyl group, and a tosyl group.

The anion part of the compound of the general formula (1) is represented by the general formula (6):

The anion part represented by the general formula (6) is preferably one or two or more kinds selected from the group consisting of a methanesulfonic acid ion, a benzenesulfonic acid ion, a toluenesulfonic acid ion, and a dodecylbenzenesulfonic acid ion.

In addition, according to the present invention, the polymerization catalyst for polythiourethane-based optical material may contain a compound represented by the general formula (2):

In the general formula (2), $R^6$, $R^7$, $R^8$ and $R^9$ each independently represent an alkyl group having 1 to 18 carbon atoms, and $R^6$, $R^7$, $R^8$ and $R^9$ may be bonded to each other to form a ring. Y represents an organic acid group derived from an organic acid selected from carboxylic acid, phosphoric acid ester, and tetraphenyl boron, and a derivative thereof, or an inorganic acid group derived from an inorganic acid selected from hydrohalogen acid, perchloric acid, carbonic acid, mono hydrogen carbonic, phosphoric acid, and boric acid. Z represents a nitrogen atom or a phosphorus atom.

$R^6$, $R^7$, $R^8$ and $R^9$ are each an alkyl group having 1 to 18 carbon atoms which may be branched, and may contain an aromatic ring, a hydroxyl group, or an amino group. Preferably, they are each an alkyl group having 1 to 18 carbon atoms, which may be optionally substituted with an aromatic ring, or a hydroxyl group, more preferably, an alkyl group having 1 to 18 carbon atoms, which may be optionally substituted with an aromatic ring.

Examples of $R^6$, $R^7$, $R^8$ and $R^9$ include a methyl group, an ethyl group, an n-propyl group, an isopropyl group, an n-butyl group, a sec-butyl group, an isobutyl group, a tert-butyl group, an n-pentyl group, an n-hexyl group, an n-heptyl group, a sec-heptyl group, a 1-propyl butyl group, an n-octyl group, a 2-ethylhexyl group, a sec-octyl group, an n-nonyl group, a 1-butylpentyl group, an n-decyl group, an n-undecyl group, a 1-pentylhexyl group, an n-dodecyl group, an n-tridecyl group, a 1-hexylheptyl group, an n-tetradecyl group, an n-pentadecyl group, a 1-heptyloctyl group, an n-hexadecyl group, an n-heptadecyl group, a 1-octylnonyl group, an n-octadecyl group, a phenyl group, and a benzyl group. For the compound of the general formula (2), from the viewpoint of the solubility of the polyiso(thio)cyanates or the active hydrogen compounds as described below, the total number of carbon atoms of $R^6$, $R^7$, $R^8$ and $R^9$ is preferably from 8 to 72, and, in order to decrease the additional amount by reducing the molecular weight of the compound of the general formula (2), the total number of carbon atoms of $R^6$, $R^7$, $R^8$ and $R^9$ is more preferably from 8 to 32.

Z represents a nitrogen atom or a phosphorus atom, which may be the same as or different from X, and it is preferably a nitrogen atom.

The cation part of the compound represented by the general formula (2) is represented by the general formula (5):

The cation part represented by the general formula (5) is preferably one or two or more kinds selected from a group consisting of a tetramethylammonium ion, a tetraethylammonium ion, a tetrapropylammonium ion, a tetrabutylammonium ion, a trioctyl methyl ammonium ion, a tributylbenzylammonium ion, and a tetrabutylphosphonium ion.

Furthermore, a mixture of the compound represented by the general formula (2) and the compound represented by the general formula (3) can be used as the polymerization catalyst for polythiourethane-based optical material according to the present invention.

In the formula, $R^5$ represents a hydrogen atom or an alkyl group having 1 to 18 carbon atoms. Examples of the compound represented by the general formula (3) include one or two or more kinds selected from a group consisting of a methanesulfonic acid, a benzenesulfonic acid, a toluenesulfonic acid, and a dodecylbenzenesulfonic acid.

In the case where the compound represented by the general formula (2) and the compound represented by the general formula (3) are mixed to obtain the polymerization catalyst for polythiourethane-based optical material of the present invention, the molar ratio of the compound of the general formula (2) to the compound of the general formula (3) is preferably 1 or more, more preferably 1 to 100, and even more preferably 1 to 30. The optical material obtained within this range is excellent in color and heat resistance.

Furthermore, when the compound of the general formula (2) and the compound of the general formula (3) are mixed, a solvent may be used. After mixing, the solvent may be removed, and the remainder of the compound of the general formula (2) and the compound of the general formula (3) may be used as it is. The solvent used here is not particularly limited, but methylalcohol, ethylalcohol, isopropyl alcohol, butylalcohol, water, or acetonitrile are all suitable, and isopropyl alcohol is preferable.

The amount of the compound of the general formula (1) to be used is generally 0.0005 parts by weight to 5 parts by weight, preferably 0.005 parts by weight to 2 parts by weight, based on 100 parts by weight of a mixture of the polyiso(thio)cyanates and the active hydrogen compounds as described below.

Here, in the case that the polymerization catalyst for polythiourethane-based optical material of the present invention further contains the compound of the general formula (2), the amounts of the compound of the general formula (1) and the compound of the general formula (2) to be used are not particularly limited, but the following amounts are preferable. The amount of the compound of the general formula (1) to be used is generally 0.0002 parts by weight to 2 parts by weight, and preferably 0.002 parts by weight to 0.8 parts by weight, based on 100 parts by weight of a mixture of the polyiso(thio)cyanates and the active hydrogen compounds as described below. Furthermore, the amount of the compound of the general formula (2) to be used is generally 0.0003 parts by weight to 3 parts by weight, and preferably 0.003 parts by weight to 1.2 parts by weight, based on 100 parts by weight of a mixture of the polyiso(thio)cyanates and the active hydrogen compounds as described below.

When a mixture of the compound of the general formula (2) and the compound of the general formula (3) is used for the polymerization catalyst for polythiourethane-based optical material of the present invention, the amounts of the compound of the general formula (2) and the compound of the general formula (3) to be used are not particularly limited, but the following amounts are preferable. The amount of the compound of the general formula (2) to be used is generally 0.0004 parts by weight to 4 parts by weight, and preferably 0.004 parts by weight to 1.6 parts by weight, based on 100 parts by weight of a mixture of the polyiso(thio)cyanates and the active hydrogen compounds as described below. The amount of the compound of the general formula (3) to be used is generally 0.0001 parts by weight to 1 parts by weight, and preferably 0.001 parts by weight to 0.4 parts by weight, based on 100 parts by weight of a mixture of the polyiso(thio)cyanates and the active hydrogen compounds as described below. A polymerization catalyst for a polythiourethane-based optical material containing the compound of the general formula (1) is obtained by mixing the compound of the general formula (2) and the compound of the general formula (3) and reacting with each other.

The above-mentioned amounts of the compounds represented by the general formulae (1) to (3) to be used can be suitably determined by the combinations of the monomers in use, the reaction catalyst species, and the kinds and amounts of additives to be used such as internal mold release agents, as well as the forms of the molded products.

The polymerizable composition for a polythiourethane-based optical material in the present invention comprises polyiso(thio)cyanates and active hydrogen compounds as its main components. As for other components, for the purpose of the modification of a polythiourethane resin, a resin modifier such as a hydroxy compound, an amine compound, an epoxy resin, an organic acid and an anhydride thereof, an olefin compound containing a (meth)acrylate compound, and the like, may be added. Herein, the resin modifier refers to a compound for adjusting or improving the physical properties of the polythiourethane resin such as the refractive index, the Abbe number, heat resistance, specific gravity, and the like, as well as the mechanical strength of the polythiourethane resin such as impact resistance, and the like.

In the present invention, the polyiso(thio)cyanates that are used as raw materials for polythiourethane resins refer to aliphatic compounds which may be branched, cyclic aliphatic compounds, or aromatic compounds having 2 to 32 carbon atoms, and having a total number of 2 or more of the isocyanato groups and/or the isothiocyanato groups in the molecule. The polyiso(thio)cyanates may be substituted with an alkyl group, an alicyclic group or an aromatic group, and may contain functional groups other than the isocyanato groups and the isothiocyanato groups. Preferably, the polyiso(thio)cyanates are compounds having 6 to 14 carbon, which contain 2 to 4 isocyanato groups.

Specifically, examples thereof include an aliphatic polyisocyanate compound, an alicyclic polyisocyanate compound, an aromatic polyisocyanate compound, a sulfur-containing aliphatic polyisocyanate compound, a sulfur-containing aromatic polyisocyanate compound, a sulfur-containing heterocyclic polyisocyanate compound, an aliphatic polyisothiocyanate compound, an alicyclic polyisothiocyanate compound, an aromatic polyisothiocyanate compound, a sulfur-containing aliphatic polyisothiocyanate compound, a sulfur-containing aromatic polyisothiocyanate compound, a sulfur-containing heterocyclic polyisothiocyanate compound, an isocyanate group-containing polyisothiocyanate compound, and the like, but the invention is not limited to these exemplified compounds. Furthermore, their halogen substituted compounds such as chlorine substituted compounds, bromine substituted compounds, and the like, alkyl substituted compounds, alkoxy substituted compounds, nitro substituted compounds, prepolymer type modified products modified with polyhydric alcohols, carbodiimide modified products, urea modified products, biuret modified products, dimerization or trimerization reaction products, and the like may be employed. These polyisocyanate compounds may be used singly or in combination of two or more kinds thereof.

Examples of the aliphatic polyisocyanate compound include hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecatriisocyanate, 1,3,6-hexamethylene triisocyanate, 1,8-diisocyanato-4-isocyanatomethyloctane, bis(isocyanatoethyl)carbonate, bis(isocyanatoethyl)ether, lysine diisocyanatomethylester, lysine triisocyanate, and the like.

Examples of the alicyclic polyisocyanate compound include isophorone diisocyanate, 1,3-bis(isocyanatomethyl)cyclohexane, 1,4-bis(isocyanatomethyl)cyclohexane, dicyclohexylmethane diisocyanate, cyclohexane diisocyanate, methylcyclohexane diisocyanate, dicyclohexyldimethylmethane isocyanate, 2,2-dimethyldicyclohexylmethane isocyanate, 2,5-bis(isocyanatomethyl)bicyclo[2,2,1]-heptane, 2,6-bis(isocyanatomethyl)bicyclo[2,2,1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane, and the like.

Examples of the aromatic polyisocyanate compound include m-xylylene diisocyanate, o-xylylene diisocyanate, p-xylylene diisocyanate, bis(isocyanatoethyl)benzene, bis(isocyanatopropyl)benzene, $\alpha,\alpha,\alpha',\alpha'$-tetramethylxylylene diisocyanate, bis(isocyanatobutyl)benzene, bis(isocyanatomethyl)naphthalene, bis(isocyanatomethyl)diphenyl ether, phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4-diphenylmethane diisocyanate, 3,3-dimethyldiphenylmethane-4,4-diisocyanate, bibenzyl-4,4-diisocyanate, bis(isocyanatophenyl)ethylene, 3,3-dimethoxybiphenyl 4,4-diisocyanate, phenylisocyanatoethylisocyanate, hexahydrobenzene diisocyanate, hexahydrodiphenylmethane-4,4-diisocyanate, bis(isocyanatoethyl)phthalate, mesitylylene triisocyanate, 2,6-di-(isocyanatomethyl)furan, and the like.

Examples of the sulfur-containing aliphatic polyisocyanate compound include bis(isocyanatoethyl)sulfide, bis(isocyanatopropyl)sulfide, bis(isocyanatohexyl)sulfide, bis(isocyanatomethyl)sulfone, bis(isocyanatomethyl)disulfide, bis(isocyanatopropyl) disulfide, bis (isocyanatomethylthio) methane, bis(isocyanatoethylthio)methane, bis(isocyanatoethylthio)ethane, bis(isocyanatomethylthio)ethane, 1,5-diisocyanato-2-isocyanatomethyl-3-thiapentane, and the like.

Examples of the sulfur-containing aromatic polyisocyanate compound include diphenyl sulfide-2,4-diisocyanate, diphenyl sulfide-4,4-diisocyanate, 3,3-dimethoxy-4,4-diisocyanatodibenzylthioether, bis(4-isocyanatomethylbenzene) sulfide, 4,4-methoxybenzenethioethylene glycol-3,3-diisocyanate, diphenyl disulfide-4,4-diisocyanate, 2,2-dimethyldiphenyl disulfide-5,5-diisocyanate, 3,3-dimethyldiphenyl disulfide-5,5-diisocyanate, 3,3-dimethyldiphenyl disulfide-6,6-diisocyanate, 4,4-dimethyldiphenyl disulfide-5,5-diisocyanate, 3,3-dimethoxydiphenyl disulfide-4,4-diisocyanate, 4,4-dimethoxydiphenyl disulfide-3,3-diisocyanate, and the like.

Examples of the sulfur-containing heterocyclic polyisocyanate compound include 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, 4,5-bis(isocyanatomethyl)-2-methyl-1,3-dithiolane, and the like, and examples of the aliphatic polyisothiocyanate compound include hexamethylenediisothiocyanate, 2,2-dimethylpentane diisothiocyanate, 2,2,4-trimethylhexane diisothiocyanate, butene diisothiocyanate, 1,3-butadiene-1,4-diisothiocyanate, 2,4,4-trimethylhexamethylenediisothiocyanate, 1,6,11-undecatriisothiocyanate, 1,3,6-hexamethylenetriisothiocyanate, 1,8-diisothiocyanato-4-isothiocyanatemethyloctane, bis(isothiocyanatoethyl)carbonate, bis(isothiocyanatoethyl)ether, lysine diisothiocyanatomethylester, lysinetriisothiocyanate, xylylene diisothiocyanato, bis(isothiocyanatoethyl)benzene, bis(isothiocyanatopropyl)benzene, α,α,α',α'-tetramethylxylylene diisothiocyanate, bis(isothiocyanatobutyl)benzene, bis(isothiocyanatomethyl)naphthalene, bis(isothiocyanatomethyl)diphenylether, bis (isothiocyanatoethyl)phthalate, mesitylylenetriisothiocyanate, 2,6-di-(isothiocyanatomethyl)furan, and the like.

Examples of the alicyclic polyisothiocyanate compound include isophorone diisothiocyanate, bis(isothiocyanatomethyl)cyclohexane, dicyclohexylmethane diisothiocyanate, cyclohexane diisothiocyanate, methylcyclohexane diisothiocyanate, dicyclohexyldimethylmethaneisothiocyanate, 2,2-dimethyldicyclohexylmethaneisothiocyanate, 2,5-bis(isothiocyanatomethyl)bicyclo[2,2,1]-heptane, 2,6-bis(isothiocyanatomethyl)bicyclo[2,2,1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, 4,9-bis(isothiocyanatomethyl)tricyclodecane, and the like.

Examples of the aromatic polyisothiocyanate compound include phenylenediisothiocyanate, tolylene diisothiocyanate, ethylphenylenediisothiocyanate, isopropylphenylenediisothiocyanate, dimethylphenylenediisothiocyanate, diethylphenylenediisothiocyanate, diisopropylphenylenediisothiocyanate, trimethylbenzenetriisothiocyanate, benzenetriisothiocyanate, biphenyl diisothiocyanate, toluidine diisothiocyanate, 4,4-diphenylmethane diisothiocyanate, 3,3-dimethyldiphenylmethane-4,4-diisothiocyanate, bibenzyl-4,4-diisothiocyanate, bis (isothiocyanatophenyl) ethylene, 3,3-dimethoxybiphenyl-4,4-diisothiocyanate, phenylisothiocyanatoethylisothiocyanate, hexahydrobenzene diisothiocyanate, hexahydrodiphenylmethane-4,4-diisothiocyanate, and the like.

Examples of the sulfur-containing aliphatic polyisothiocyanate compound include bis(isothiocyanatoethyl)sulfide, bis(isothiocyanatopropyl)sulfide, bis(isothiocyanatohexyl)sulfide, bis(isothiocyanatomethyl)sulfone, bis(isothiocyanatomethyl)disulfide, bis(isothiocyanatopropyl)disulfide, bis(isothiocyanatomethylthio)methane, bis(isothiocyanatoethylthio)methane, bis(isothiocyanatoethylthio)ethane, bis(isothiocyanatomethylthio)ethane, 1,5-diisothiocyanato-2-isothiocyanatomethyl-3-thiapentane, and the like, and examples of the sulfur-containing aromatic polyisothiocyanate compound include diphenyl sulfide-2,4-diisothiocyanate, diphenyl sulfide-4,4-diisothiocyanate, 3,3-dimethoxy-4,4-diisothiocyanatodibenzylthioether, bis(4-isothiocyanatomethylbenzene)sulfide, 4,4-methoxybenzenethioethylene glycol-3,3-diisothiocyanate, diphenyl disulfide-4,4-diisothiocyanate, 2,2-dimethyldiphenyl disulfide-5,5-diisothiocyanate, 3,3-dimethyldiphenyl disulfide-5,5-diisothiocyanate, 3,3-dimethyldiphenyl disulfide-6,6-diisothiocyanate, 4,4-dimethyldiphenyl disulfide-5,5-diisothiocyanate, 3,3-dimethoxydiphenyl disulfide-4,4-diisothiocyanate, 4,4-dimethoxydiphenyl disulfide-3,3-diisothiocyanate, and the like.

Examples of the sulfur-containing heterocyclic polyisothiocyanate compound include 2,5-diisothiocyanatothiophene, 2,5-bis(isocyanatomethyl)thiophene, 2,5-diisothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, 4,5-bis(isothiocyanatomethyl)-1,3-dithiolane, 4,5-bis(isothiocyanatomethyl)-2-methyl-1,3-dithiolane, and the like. Examples of the isocyanate group-containing polyisothiocyanate compound include aliphatic or alicyclic compounds such as 1-isocyanato-3-isothiocyanatopropane, 1-isocyanato-5-isothiocyanatopentane, 1-isocyanato-6-isothiocyanatohexane, isocyanatocarbonylisothiocyanate, 1-isocyanato-4-isothiocyanatocyclohexane, and the like, aromatic compounds such as 1-isocyanato-4-isothiocyanatobenzene, 4-methyl-3-isocyanato-1-isothiocyanatobenzene, and the like, and heterocyclic compounds such as 2-isocyanato-4,5-diisothiocyanato-1,3,5-triazine, and the like, 4-isocyanato-4'-isothiocyanatodiphenyl sulfide, 2-isocyanato-2'-isothiocyanatodiethyl disulfide, and the like.

Among these, as the polyiso(thio)cyanates, one or two or more kinds selected from the group consisting of m-xylylene diisocyanate, 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane, and hexamethylene diisocyanate may be preferably exemplified.

The active hydrogen compounds that are used as raw materials for the polythiourethane resin of the present invention refer to aliphatic compounds which may be branched, cyclic aliphatic compounds, or aromatic compounds having from 1 to 50 carbon atoms, and having a total number of 2 or more of the hydroxyl groups and/or the mercapto groups in the molecule. The active hydrogen compounds may be substituted with an alkyl group, an alicyclic group, and an aromatic group, and may contain functional groups other than the hydroxyl groups and the mercapto groups, and they are preferably compounds having from 2 to 15 carbon atoms, which contain from 2 to 5 mercapto groups.

Specifically, the aliphatic polythiol compound, the aliphatic polythiol compound containing an ester bond, the aromatic polythiol compound, the heterocyclic thiol compound, the aliphatic polythiol compound having one or more sulfide bonds in one molecule, the aliphatic polythiol containing an ester bond and having one or more sulfide bonds in one molecule, the heterocyclic polythiol compound, the polythiol compound having a dithioacetal or dithioketal skeleton and having one or more sulfide bonds in one molecule, the active hydrogen compound having an orthotrithioformic acid ester skeleton and having one or more sulfide bonds in one molecule, the polythiol compound that may have one or more hydroxyl groups, and the like can all be used, but the invention is not limited to these exemplified compounds. In addition, their halogen substituted compounds such as chlorine substituted compounds, bromine substituted compounds may be employed. These active hydrogen compounds may be used singly or in combination of two or more kinds thereof.

Examples of the aliphatic polythiol compound include methanedithiol, 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, 1,2-dimercaptopropylmethyl ether, 2,3-dimercaptopropylmethyl ether, 2,2-bis(mercaptomethyl)-1,3-propanedithiol, bis(2-mercaptoethyl)ether, tetrakis(mercaptomethyl)methane, and the like.

Examples of the aliphatic polythiol compound containing an ester bond include 2,3-dimercaptosuccinic acid (2-mercaptoethylester), thiomalic acid bis (2-mercaptoethylester), 2,3-dimercapto-1-propanol(2-mercaptoacetate), 2,3-dimercapto-1-propanol(3-mercaptopropionate), 3-mercapto-1,2-propanediol di(2-mercaptoacetate), 3-mercapto-1,2-propanediol di(3-mercaptopropionate), diethylene glycol bis(2-mercaptoacetate), diethylene glycol bis (3-mercaptopropionate), ethylene glycol bis (2-mercaptoacetate), ethylene glycol bis(3-mercaptopropionate), trimethylolpropane tris(2-mercaptoacetate), trimethylolpropane tris (3-mercaptopropionate), trimethylolethane tris(2-mercaptoacetate), trimethylolethane tris(3-mercaptopropionate), pentaerythritoltetrakis(2-mercaptoacetate), pentaerythritoltetrakis(3-mercaptopropionate), glycerine tris(2-mercaptoacetate), glycerine tris(3-mercaptopropionate), 1,4-cyclohexanediol bis(2-mercaptoacetate), 1,4-cyclohexanediol bis(3-mercaptopropionate), and the like.

Examples of the aromatic polythiol compound include 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 2,5-toluenedithiol, 3,4-toluenedithiol, 1,3-di-(p-methoxyphenyl)propane-2,2-dithiol, 1,3-diphenylpropane-2,2-dithiol, phenylmethane-1,1-dithiol, 2,4-di-(p-mercaptophenyl)pentane, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptomethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 4,4'-dimercaptobibenzyl, 2,5-dichlorobenzene-1,3-dithiol, 1,3-di-(p-chlorophenyl)propane-2,2-dithiol, 3,4,5-tribromo-1,2-dimercaptobenzene, 2,3,4,6-tetrachloro-1,5-bis (mercaptomethyl)benzene, and the like.

Examples of the heterocyclic thiol compound include 2-methylamino-4,6-dithiol-sym-triazine, 2-ethylamino-4,6-dithiol-sym-triazine, 2-amino-4,6-dithiol-sym-triazine, 2-morpholino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine, 2-thiobutyloxy-4,6-dithiol-sym-triazine, and the like.

Examples of the aliphatic polythiol compound having one or more sulfide bonds in one molecule include bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-mercapto-3,6,9-trithiaundecane, 4,7-dimercaptomethyl-1,11-mercapto-3,6,9-trithiaundecane, 4,8-dimercaptomethyl-1,11-mercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, 2,5-dimercaptomethyl-2,5-dimethyl-1,4-dithiane, and the like.

Examples of the aliphatic polythiol containing an ester bond and having one or more sulfide bonds in one molecule include esters of thioglycolic acid and mercaptopropionic acid, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis (3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2- mercaptoacetate), 2-mercaptoethyl ether bis(3-mercaptopropionate), 1,4-dithiane-2,5-diol bis(3-mercaptopropionate), thiodiglycolic acid bis(2-mercaptoethylester), thiodipropionic acid bis(2-mercaptoethylester), 4,4-thiodibutyric acid bis(2-mercaptoethylester), dithiodiglycolic acid bis(2-mercaptoethylester), dithiodipropionic acid bis(2-mercaptoethylester), 4,4-dithiodibutyric acid bis(2-mercaptoethylester), thiodiglycolic acid bis(2,3-dimercaptopropylester), thiodipropionic acid bis(2,3-dimercaptopropylester), dithiodiglycolic acid bis(2,3-dimercaptopropylester), thiodipropionic acid bis(2,3-dimercaptopropylester), dithiodipropionic acid bis(2,3-dimercaptopropylester), and the like.

Examples of the heterocyclic polythiol compound include 3,4-thiophenedithiol, bismuthiol, and the like.

Examples of the polythiol compound having a dithioacetal or dithioketal skeleton and having one or more sulfide bonds in one molecule include 1,1,3,3-tetrakis(mercaptomethylthio)propane, 1,1,2,2-tetrakis(mercaptomethylthio)ethane, 4,6-bis(mercaptomethylthio)-1,3-dithiacyclohexane, 1,1,5,5-tetrakis(mercaptomethylthio)-3-thiapentane, 1,1,6,6-tetrakis(mercaptomethylthio)-3,4-dithiahexane, 2,2-bis(mercaptomethylthio)ethanethiol, 2-(4,5-dimercapto-2-thiapentyl)-1,3-dithiacyclopentane, 2,5-bis(4,4-bis(mercaptomethylthio)-2-thiabutyl)-1,4-dithiane, 2,2-bis(mercaptomethylthio)-1,3-propanedithiol, 3-mercaptomethylthio-1,7-dimercapto-2,6-dithiaheptane, 3,6-bis(mercaptomethylthio)-1,9-dimercapto-2,5,8-trithianonane, 3-mercaptomethylthio-1,6-dimercapto-2,5-dithiahexane, 2-(2,2-bis(mercaptomethylthio)ethyl)-1,3-dithiethane, 1,1,9,9-tetrakis(mercaptomethylthio)-5-(3,3-bis(mercaptomethylthio)-1-thiapropyl)-3,7-dithianonane, tris(2,2-bis(mercaptomethylthio)ethyl)methane, tris(4,4-bis(mercaptomethylthio)-2-thiabutyl)methane, tetrakis(2,2-bis(mercaptomethylthio)ethyl)methane, tetrakis(4,4-bis(mercaptomethylthio)-2-thiabutyl)methane, 3,5,9,11-tetrakis(mercaptomethylthio)-1,13-dimercapto-2,6,8,12-tetrathiatridecane, 3,5,9,11,15,17-hexakis(mercaptomethylthio)-1,19-dimercapto-2,6,8,12,14,18-hexathianonadecane, 9-(2,2-bis(mercaptomethylthio)ethyl)-3,5,13,15-tetrakis(mercaptomethylthio)-1,17-dimercapto-2,6,8,10,12,16-hexathiaheptadecane, 3,4,8,9-tetrakis(mercaptomethylthio)-1,11-dimercapto-2,5,7,10-tetrathiaundecane, 3,4,8,9,13,14-hexakis(mercaptomethylthio)-1,16-dimercapto-2,5,7,10,12,15-hexathiahexadecane, 8-[bis(mercapto methylthio)methyl]-3,4,12,13-tetrakis(mercaptomethylthio)-1,15-dimercapto-2,5,7,9,11,14-hexathiapentadecane, 4,6-bis[3,5-bis(mercaptomethylthio)-7-mercapto-2,6-dithiaheptylthio]-1,3-dithiane, 4-[3,5-bis(mercaptomethylthio)-7-mercapto-2,6-dithiaheptylthio]-6-mercaptomethylthio-1,3-dithiane, 1,1-bis[4-(6-mercaptomethylthio)-1,3-dithianylthio]-1,3-bis(mercaptomethylthio)propane, 1-[4-(6-mercaptomethylthio)-1,3-dithianylthio]-3-[2,2-bis(mercaptomethylthio)ethyl]-7,9-bis(mercaptomethylthio)-2,4,6,10-tetrathiaundecane, 1,5-bis[4-(6-mercaptomethylthio)-1,3-dithianylthio]-3-[2-(1,3-dithietanyl)]methyl-2,4-dithiapentane, 4,6-bis{3-[2-(1,3-dithietanyl)]methyl-5-mercapto-2,4-dithiapentylthio}-1,3-dithiane, 4,6-bis[4-(6-mercaptomethylthio)-1,3-dithianylthio]-6-[4-(6-mercaptomethylthio)-1,3-dithianylthio]-1,3-dithiane, 3-[2-(1,3-dithietanyl)]methyl-7,9-bis(mercaptomethylthio)-1,11-dimercapto-2,4,6,10-tetrathiaundecane, 9-[2-(1,3-dithietanyl)]methyl-3,5,13,15-tetrakis(mercaptomethylthio)-1,17-dimercapto-2,6,8,10,12,16-hexathiaheptadecane, 3-[2-(1,3-dithietanyl)]methyl-7,9,13,15-tetrakis(mercaptomethylthio)-1,17-dimercapto-2,4,6,10,12,16-hexathiaheptadecane, 3,7-bis[2-(1,3-dithietanyl)]methyl-1,9-dimercapto-2,4,6,8-tetrathianonane, 4-[3,4,8,9-tetrakis(mercaptomethylthio)-11-mercapto-2,5,7,10-tetrathiaundecyl]-5-mercaptomethylthio-1,3-dithiolane, 4,5-bis[3,4-bis(mercaptomethylthio)-6-mercapto-2,5-dithiahexylthio]-1,3-dithiolane, 4-[3,4-bis(mercaptomethylthio)-6-mercapto-2,5-dithiahexylthio]-5-mercaptomethylthio-1,3-dithiolane, 4-[3-bis(mercaptomethylthio)methyl-5,6-bis(mercaptomethylthio)-8-mercapto-2,4,7-trithiaoctyl]-5-mercaptomethylthio-1,3-dithiolane, 2-{bis[3,4-bis(mercaptomethylthio)-6-mercapto-2,5-dithiahexylthio]methyl}-1,3-dithiethane, 2-[3,4-bis(mercaptomethylthio)-6-mercapto-2,5-dithiahexylthio]mercaptomethylthiomethyl-1,3-dithiethane, 2-[3,4,8,9-tetrakis(mercaptomethylthio)-11-mercapto-2,5,7,10-tetrathiaundecylthio]mercaptomethylthiomethyl-1,3-dithiethane, 2-[3-bis(mercaptomethylthio)methyl-5,6-bis(mercaptomethylthio)-8-mercapto-2,4,7-trithiaoctyl]mercaptomethylthiomethyl-1,3-dithiethane, 4,5-bis{1-[2-(1,3-dithietanyl)]-3-mercapto-2-thiapropylthio}-1,3-dithiolane, 4-{1-[2-(1,3-dithietanyl)]-3-mercapto-2-thiapropylthio}-5-[1,2-bis(mercaptomethylthio)-4-mercapto-3-thiabutylthio]-1,3-dithiolane, 2-{bis[4-(5-mercaptomethylthio-1,3-dithioranyl)thio]methyl}-1,3-dithiethane, 4-[4-(5-mercaptomethylthio-1,3-dithioranyl)thio]-5-{1-[2-(1,3-dithietanyl)]-3-mercapto-2-thiapropylthio}-1,3-dithiolane, their oligomers, and the like.

Examples of the active hydrogen compound having an orthotrithioformic acid ester skeleton and having one or more sulfide bonds in one molecule include tris(mercaptomethylthio)methane, tris(mercaptoethylthio)methane, 1,1,5,5-tetrakis(mercaptomethylthio)-2,4-dithiapentane, bis[4,4-bis(mercaptomethylthio)-1,3-dithiabutyl]-(mercaptomethylthio)methane, tris[4,4-bis(mercaptomethylthio)-1,3-dithiabutyl]methane, 2,4,6-tris(mercaptomethylthio)-1,3,5-trithiacyclohexane, 2,4-bis(mercaptomethylthio)-1,3,5-trithiacyclohexane, 1,1,3,3-tetrakis(mercaptomethylthio)-2-thiapropane, bis(mercaptomethyl)methylthio-1,3,5-trithiacyclohexane, tris[(4-mercaptomethyl-2,5-dithiacyclohexyl-1-yl)methylthio]methane, 2,4-bis(mercaptomethylthio)-1,3-dithiacyclopentane, 2-mercaptoethylthio-4-mercaptomethyl-1,3-dithiacyclopentane, 2-(2,3-dimercaptopropylthio)-1,3-dithiacyclopentane, 4-mercaptomethyl-2-(2,3-dimercaptopropylthio)-1,3-dithiacyclopentane, 4-mercaptomethyl-2-(1,3-dimercapto-2-propylthio)-1,3-dithiacyclopentane, tris[2,2-bis(mercaptomethylthio)-2-thiapropyl]methane, tris[4,4-bis(mercaptomethylthio)-3-thiabutyl]methane, 2,4,6-tris[3,3-bis(mercaptomethylthio)-2-thiapropyl]-1,3,5-trithiacyclohexane, tetrakis[3,3-bis(mercaptomethylthio)-2-thiapropyl]methane, their oligomers, and the like.

Furthermore, examples of the polythiol compound that may have one or more hydroxyl groups include 2-mercaptoethanol, 3-mercapto-1,2-propanediol, glycerine di(mercaptoacetate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, pentaerythritoltris(3-mercaptopropionate), pentaerythritolmono(3-mercaptopropionate), pentaerythritolbis(3-mercaptopropionate), pentaerythritoltris(thioglycolate), pentaerythritolpentakis(3-mercaptopropionate), hydroxymethyl-tris(mercaptoethylthiomethyl)methane, 1-hydroxyethylthio-3-mercaptoethylthiobenzene, 4-hydroxy-41-mercaptodiphenylsulfone, 2-(2-mercaptoethylthio)ethanol, dihydroxyethyl sulfide mono(3-mercaptopropionate), dimercaptoethane mono(salicylate), hydroxyethylthiomethyl-tris(mercaptoethylthio)methane, and the like.

Examples of the hydroxy compound used as a resin modifier of the polythiourethane resin of the present invention include diethylene glycol, triethylene glycol, 1,3-propanediol, dipropylene glycol, tripropylene glycol, 1,4-butanediol, 1,3-butanediol, 1,5-pentanediol, 1,4-pentanediol, 1,3-pentanediol, 1,6-hexanediol, 1,5-hexanediol, 1,4-hexanediol, 1,3-hexanediol, 1,7-heptanediol, 1,8-octanediol, thiodiethanol, dithiodiethanol, thiodipropanol, dithiodipropanol, their oligomers, and the like, but the invention is not limited to these exemplified compounds. These hydroxy compounds may be used singly or in combination of two or more kinds thereof.

Examples of the amine compound that can be added as a resin modifier include monofunctional primary amine compounds such as ethylamine, n-propylamine, isopropylamine, n-butylamine, sec-butylamine, tert-butylamine, pentylamine, hexylamine, heptylamine, octylamine, decylamine, laurylamine, myristylamine, 3-pentylamine, 2-ethylhexylamine, 1,2-dimethylhexylamine, arylamine, aminomethylbicycloheptane, cyclopentylamine, cyclohexylamine, 2,3-dimethylcyclohexylamine, aminomethylcyclohexane, aniline, benzylamine, phenethylamine, 2,3-, or 4-methylbenzylamine, o-, m-, or p-methylaniline, o-, m-, or p-ethylaniline, aminomorpholine, naphthylamine, furfurylamine, α-aminodiphenylmethane, toluidine, aminopyridine, aminophenol, aminoethanol, 1-aminopropanol, 2-aminopropanol, aminobutanol, aminopentanol, aminohexanol, methoxyethylamine, 2-(2-aminoethoxy)ethanol, 3-ethoxypropylamine, 3-propoxypropylamine, 3-butoxypropylamine, 3-isopropoxypropylamine, 3-isobutoxypropylamine, 2,2-diethoxyethylamine, primary polyamine compounds such as ethylenediamine, 1,2-, or 1,3-diaminopropane, 1,2-, 1,3-, or 1,4-diaminobutane, 1,5-diaminopentane, 1,6-diaminohexane, 1,7-diaminoheptane, 1,8-diaminooctane, 1,10-diaminodecane, 1,2-, 1,3-, or 1,4-diaminocyclohexane, o-, m- or p-diaminobenzene, 3,4- or 4,4'-diaminobenzophenone, 3,4- or 4,4'-diaminodiphenyl ether, 4,4'-diaminodiphenylmethane, 4,4'-diaminodiphenyl sulfide, 3,3'-, or 4,4'-diaminodiphenylsulfone, 2,7-diaminofluorene, 1,5-, 1,8-, or 2,3-diaminonaphthalene, 2,3-, 2,6-, or 3,4-diaminopyridine, 2,4-, or 2,6-diaminotoluene, m-, or p-xylylenediamine, isophoronediamine, diaminomethylbicycloheptane, 1,3-, or 1,4-diaminomethylcyclohexane, 2-, or 4-aminopiperidine, 2-, or 4-aminomethylpiperidine, 2-, or 4-aminoethylpiperidine, N-aminoethylmorpholine, N-aminopropylmorpholine, monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diarylamine, N-methylarylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, morpholine, and secondary polyamine compounds such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, tetramethylguanidine, but the invention is not limited to these exemplified compounds. These amine compounds may be used singly or in combination of two or more kinds thereof.

As for the epoxy resin which can be added as a resin modifier, a phenol type epoxy compound obtained by the condensation reaction of a polyhydric phenol compound such as bisphenol A glycidyl ether with an epihalohydrin compound, an alcohol type epoxy compound obtained by condensation of a polyhydric alcohol compound such as hydrogenated bisphenol A glycidyl ether with an epihalohydrin compound, a glycidyl ester type epoxy compound obtained by condensation of a multivalent organic acid compound such as 3,4-epoxycyclohexylmethyl-3',4'-epoxycyclohexane carboxylate and 1,2-hexahydrophthalic acid diglycidyl ester with an epihalohydrin compound, an amine type epoxy compound obtained by condensation of a primary or secondary diamine compound with an epihalohydrin compound, and an aliphatic multivalent epoxy compound such as vinylcyclohexene diepoxide, and the like may be exemplified, but the invention is not limited to these exemplified compounds. These epoxy resin may be used singly or in combination of two or more kinds thereof.

As for the organic acid and the anhydride thereof which can be added as a resin modifier, thiodiglycolic acid, thiodipropionic acid, dithiodipropionic acid, phthalic anhydride, hexahydrophthalic anhydride, methylhexahydrophthalic anhydride, methyltetrahydrophthalic anhydride, methylnorbornene anhydride, methylnorbornene anhydride, maleic anhydride, trimellitic anhydride, pyromellitic anhydride and the like may be exemplified, but is not limited only to these exemplified compounds. These organic acids and anhydrides thereof may be used singly or in combination of two or more kinds thereof.

As for the olefin compound which can be added as a resin modifier, (meth)acrylate compounds such as benzyl acrylate, benzyl methacrylate, butoxyethyl acrylate, butoxymethyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentylglycol diacrylate, neopentylglycol dimethacrylate, ethylene glycol bisglycidyl acrylate, ethylene glycol bisglycidyl methacrylate, bisphenol A diacrylate, bisphenol A dimethacrylate, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, bisphenol F diacrylate, bisphenol F dimethacrylate, 1,1-bis(4-acryloxyethoxyphenyl)methane, 1,1-bis(4-methacryloxyethoxyphenyl)methane, 1,1-bis(4-acryloxydiethoxyphenyl)methane, 1,1-bis(4-methacryloxydiethoxyphenyl)methane, dimethyloltricyclodecane diacrylate, trimethylolpropane triacrylate, trimethylolpropane trimethacrylate, glycerol diacrylate, glycerol dimethacrylate, pentaerythritol triacrylate, pentaerythritol tetraacrylate, pentaerythritol tetramethacrylate, methylthioacrylate, methylthiomethacrylate, phenylthioacrylate, benzylthiomethacrylate, xylylenedithioldiacrylate, xylylenedithiol dimethacrylate, mercaptoethyl sulfide diacrylate, mercaptoethyl sulfide dimethacrylate and the like, allyl compounds such as allyl glycidyl ether, diallyl phthalate, diallyl terephthalate, diallyl isophthalate, diallyl carbonate, diethylene glycol bisallylcarbonate and the like, and vinyl compounds such as styrene, chlorostyrene, methylstyrene, bromostyrene, dibromostyrene, divinylbenzene, 3,9-divinylspirobi (m-dioxane) and the like may be exemplified, is not limited only to these exemplified compounds. These olefin compounds may be used singly or in combination of two or more kinds thereof.

Next, a method for preparing the polythiourethane resin of the present invention will be described.

In the present invention, a molar ratio of the functional groups of the iso(thio)cyanato groups contained in the polyiso(thio)cyanates to the hydroxyl groups and/or mercapto groups contained in the active hydrogen compounds, in the monomer mixture including the polyiso(thio)cyanates and the active hydrogen compounds, is usually in the range of 0.5 to 3.0, preferably in the range of 0.6 to 2.0, and more preferably in the range of 0.8 to 1.3.

Furthermore, the content of the polymerization catalyst for a polythiourethane-based optical material of the present invention is, for example, 0.0005 parts by weight to 5 parts by weight, and preferably 0.005 parts by weight to 2 parts by weight, based on 100 parts by weight of the monomer mixture.

At the time of molding the polythiourethane resin of the present invention, a variety of substances such as a chain extender, a cross-linking agent, a light stabilizer, an ultraviolet absorber, an anti-oxidant, an anti-coloring agent, an oil-soluble dye, a filler, an external or internal mold release agent, an adhesion improving agent, may be added, depending on the purposes, as is done in conventional molding methods. When a plastic lens is produced with the polythiourethane resin of the present invention, it can usually be obtained by the casting polymerization. It is preferable that an internal mold release agent including typical examples of phosphoric acid esters is added in advance to the polymerizable composition in the present invention in order to accelerate the release of the lens from the mold after the polymerization. Alternatively, the mold can be treated with an external mold release agent in advance.

Next, a method for preparing the monomer will be described.

In the present invention, when the polyiso(thio)cyanates, the active hydrogen compounds, a reaction catalyst, a mold release agent, and other additives are mixed before the polymerization to prepare a polymerizable composition, the order of addition of the catalyst, the mold release agent and other additives will vary depending on their solubility into the monomers. However, they may be added to polyiso(thio)cyanates and dissolved therein in advance, added to the active hydrogen compounds and dissolved therein in advance, or added to a mixture of the polyiso(thio)cyanates and the active hydrogen compounds and dissolved therein. Alternatively, the catalyst, the mold release agent, and other additives may be dissolved in a part of the monomers in use to prepare a master solution, and then the master solution may be added to the monomer mixture. As for the mixing of the compound represented by the general formula (2) and the sulfonic acid derivative represented by the general formula (3), they may be mixed in advance, and then added to the monomers or a part thereto and dissolved therein, or mixed in the monomers in use or apart thereof and dissolved therein. The order of addition is not restricted to these exemplified methods, and should be properly selected on the basis of operability, safety, expediency, and/or the like. For example, a method in which the polymerization catalyst for polythiourethane-based optical material of the present invention, the mold release agent, and other additives are be added to the polyiso(thio)cyanates and dissolved in apart of the polyiso(thio)cyanates to prepare a master solution, and then the master solution is added to the monomer mixture is a preferable.

When the polyiso(thio)cyanates and the active hydrogen compounds, the reaction catalyst, the mold release agent and other additives are mixed to prepare a polymerizable composition, the temperature at that time can be 25 degrees C. or higher. Since the polymerization catalyst for polythiourethane-based optical material of the present invention has low activity at a low temperature, it is usually 25 degrees C. or lower. From the viewpoint of increased pot life of the composition, it is sometimes preferable to employ a lower temperature than 25 degrees C. However, when the solubility of the reaction catalyst, the mold release agent, and the additives into the monomers is insufficient, it is also possible to heart them in advance and then to dissolve them in the polyiso(thio)cyanates or the active hydrogen compounds that are the monomers, or a monomer mixture. In addition, it is preferable to prepare these polymerization compositions under a nitrogen atmosphere.

As a typical polymerization method for obtaining the polythiourethane resin (for example, plastic lens) of the present invention from the thus obtained monomer mixed composition, casting polymerization may be considered. Namely, the polymerizable composition of the present invention is injected between molds held by a gasket, a tape, and the like. At this time, depending on the physical properties required for the obtained plastic lens, it is preferable that such processes as a defoaming process under reduced pressure, a filtration process such as under an applied pressure, a reduced pressure, and the like, may be employed as necessary in many cases.

Subsequently, the composition can be subjected to curing by heating the mold in a heating apparatus such as an oven, in water, and then the resin can be taken out therefrom.

In order to obtain the transparent resin of the present invention, the type and amount of the reaction catalysts, and the like, and the type and ratio of the monomers will vary depending on the configuration of the composition to be polymerized, and are not absolutely restricted. However, the aforementioned conditions are preferred in many cases.

The conditions of the heat polymerization of the composition of the present invention to be injected into the mold will vary significantly depending on the composition of the polymerizable composition of the present invention, the type of reaction catalysts, the shape of the molds, and the like, and thus, cannot be restricted. However, the polymerization is conducted at a temperature of about −50 to 200 degrees C. over 1 to 100 hours.

In some cases, the composition is preferably polymerized by keeping or gradually raising the temperature within a range of 10 to 130 degrees C. for 1 to 24 hours.

In addition, the resin taken out from the mold may be subjected to a treatment such as annealing, as necessary. The annealing temperature is usually from 50 to 200 degrees C., preferably from 90 to 150 degrees C. and more preferably from 100 to 130 degrees C.

The resin obtained by curing the composition for optical material of the present invention is a resin that is excellent in color hue. The transparent resin of the present invention can be produced as a molded article in various shapes by changing the mold at the time of casting polymerization. The resin can be used for various applications such as optical resins for spectacle lenses, camera lenses, light emitting diodes (LED). In particular, the transparent resins are suitable for use as optical material or an optical element of spectacle lenses, camera lenses, light emitting diodes, and the like.

For the purposes of improving anti-reflection, granting high durability, improving wear resistance, improving chemical resistance, granting anti-clouding property, granting fashionability and photochromic properties, and the like, known physical or chemical treatments such as surface polishing, antistatic treatment, a coating treatment on one or both surfaces, a dyeing treatment and a photochromic treatment can be performed as necessary on a plastic lens using the polythiourethane resin of the present invention.

As a coating layer formed by the coating process, a primer layer, a hard coat layer, an anti-reflection film layer, an anti-clouding coating film layer, an anti-fouling layer, a water repelling layer, and the like may be mentioned. These coating layers may each be used singly or a plurality of coating layers may be used in a multi-layered structure. When the coating layers are applied on both surfaces of the lens, the same coating layer or different coating layers may be applied on each surface.

These coating layers may each be used together with an ultraviolet absorber for the purpose of protecting the lenses or the eyes from ultraviolet rays, an infrared ray absorber for the purpose of protecting the eyes from infrared rays, a light stabilizer or an anti-oxidant for the purpose of improving the weather resistance of the lenses, a dye or a pigment for the purpose of enhancing the fashionability of the lenses, or furthermore, a photochromic dye or a photochromic pigment, an anti-static agent, and other known additives for improving the performances of lenses. Various leveling agents may be used for the purpose of improving the coating property of the layer to be coated by the coating process.

The primer layer is usually formed between a hard coat layer to be described below and the optical lens. The primer layer is a coating layer for the purpose of improving the adhesion between the hard coat layer to be formed thereon and the lens, and the impact resistance can also be improved in some cases.

Any material can be used for the primer layer as long as it has high adhesion to the obtained optical lens, but usually a primer composition, and the like containing a urethane-based resin, an epoxy-based resin, a polyester-based resin, a melanin-based resin or a polyvinyl acetal, and the like as the main component is used. A suitable solvent which does not affect the lens may be used in the primer composition for the purpose of adjusting the viscosity of the composition. Alternatively, no solvent may be employed.

The primer composition can be applied by any coating method or dry method. When the coating method is employed, the primer layer is formed by a known coating method such as spin coating and dip coating, and then solidified to form a primer layer. When the dry method is employed, the primer layer is formed by a known dry method such as a CVD method and a vacuum deposition method. Upon forming a primer layer, the surface of the lens may be subjected to a pre-treatment such as an alkaline treatment, a plasma treatment and an ultraviolet treatment, as necessary for the purpose of improving the adhesion of the primer layer.

The hard coat layer refers to a coating layer for the purpose of providing the surface of the lens with properties such as abrasion resistance, wear resistance, humidity resistance, hot water resistance, heat resistance and weather resistance.

The hard coat layer is generally formed from a hard coat composition is used which contains an organic silicon compound having curing properties and one or more fine oxide particles containing at least one or more elements selected from the element group of Si, Al, Sn, Sb, Ta, Ce, La, Fe, Zn, W, Zr, In and Ti, and/or one or more fine particles comprising composite oxides of two or more elements selected from that element group. It is preferable that the hard coat composition contains at least one of the following: amines, amino acids, complexes of metal acetylacetonate, metal salts of organic acids, perchloric acids, salts of perchloric acids, acids, metal chlorides, and polyfunctional epoxy compounds, in addition to the aforementioned components. A suitable solvent which does not affect the lens may be used in the hard coat composition. Alternatively, no solvent may be employed.

The hard coat layer is usually formed by applying the hard coat composition using a known coating method such as spin coating and dip coating, and then curing the resulting material. As for the curing method, methods for curing by thermal curing, or by irradiation with energy beams such as ultraviolet rays, visible rays or the like can be considered. The difference of the refractive index between the hard coat layer and the lens is preferably in a range of ±0.1 to suppress the generation of interference fringes.

An anti-reflection layer is usually formed on the aforementioned hard coat layer as needed. As for the anti-reflection layer, there are inorganic-based layers and organic-based layers. In the case of the inorganic-based layer, the layer is formed by a dry method such as a vacuum deposition method, a sputtering method, an ion plating method, an ion beam assisted method and a CVD method using an inorganic oxide such as $SiO_2$ and $TiO_2$. In the case of the organic-based layer, the layer is formed by a wet method using a composition containing an organic silicon compound and silica-based fine particles having internal pores.

The anti-reflection layer is composed of a single layer or multi layers. When composed of a single layer, it is preferable that its refractive index is lower by at least 0.1 or more than that of the hard coat layer. In order to effectively exhibit an anti-reflection function, a multi-layered anti-reflection film is preferable. In this case, a low refractive index film and a high refractive index film are alternately stacked. In this case, it is also preferable that the difference the refractive index between the low refractive index film and the high refractive index film is 0.1 or more. As for the high refractive index film, films of $ZnO$, $TiO_2$, $CeO_2$, $Sb_2O_5$, $SnO_2$, $ZrO_2$, $Ta_2O_5$, and the like can be exemplified. As for the low refractive index film, a $SiO_2$ film, and the like may be exemplified.

On the anti-reflection film layer, an anti-clouding coating film layer, an anti-fouling layer or a water repelling layer may be formed as necessary. As for methods of forming an anti-clouding coating layer, an anti-fouling layer or a water repelling layer, so far as they do not adversely affect the anti-reflection function, the treating methods, treating materials and the like are not particularly limited. Known anti-clouding coating treating methods, anti-fouling treating methods, water repelling treating methods and materials can be used. For example, in the anti-clouding coating treating method and anti-fouling treating method, there can be exemplified a method for covering the surface with a surfactant, a method for adding a hydrophilic film to the surface for the water absorbent property, a method for making the surface concave and convex for enhancing its water absorbency, a method for improving water absorbency by using photocatalytic activity, a method for conducting an ultra-water repelling treatment to prevent attachment of waterdrops and the like. Furthermore, as for the water repelling treatment method, there can be exemplified methods for forming a water repelling treatment layer by subjecting a fluorine-containing silane compound or the like to deposition or sputtering, a method for forming a water repelling treatment layer by dissolving the fluorine-containing silane compound in a solvent, and then coating the surface, and the like.

The lens can be dyed by a known dyeing method. However, it is usually dyed with one of the following methods:

(1) a method involving immersing the lens in a dye solution, (2) a method involving coating the lens using a coating agent containing a pigment or a method involving forming a coating layer capable of being dyed and dyeing the coating layer, (3) a method involving adding a material capable of being dyed into the raw material monomer and then being polymerized, and (4) a method involving heating a sublimation pigment for sublimation.

The method in (1) generally refers to a method involving immersing a predetermined optical surface-finished lens material in a pigment solution with a dye in use dissolved or homogeneously dispersed therein (the dyeing process) and then, as required, heating the lens to solidify the pigment (the annealing process after dyeing). The pigment used in the dyeing process is not particularly limited as long as it is a known pigment. However, an oil soluble dyestuff or a disperse dye is usually used. The solvent used in the dyeing process is not particularly limited as long as the pigment in use can be dissolved or homogeneously dispersed therein. In this dyeing process, a surfactant for dispersing the pigment in the dye solution or a carrier for promoting dyeing may be added as required. The dyeing process involves dispersing a pigment and a surfactant to be added as needed in water or a mixture of water and an organic solvent to prepare a dye bath, immersing the optical lens in the dye bath and dyeing it at a predetermined temperature for a predetermined time. The dye temperature and the time vary depending on the desired coloring concentration, but the temperature is usually 120 degrees C. or lower, and the time taken from about several minutes to several tens of hours. The dye concentration of the dye bath is from 0.01 to 10 weight %. Furthermore, when dyeing is difficult, it may be carried out under an applied pressure. The annealing process after the dyeing has been conducted as required is a process for heating the dyed lens material. The heating process is carried out such that water remaining on the surface of the lens material dyed in the dyeing process is removed using a solvent, and the like, or the solvent is air dried, and then the lens material is left, for example, in a furnace such as an infrared heating furnace, a resistance heating furnace or the like in an ambient atmosphere for a predetermined time. The annealing process after dyeing involves preventing the decolorization of the dyed lens material (the decolorization-preventing process) and at the same time eliminating any water that has penetrated to the inside of the lens material at the time of dyeing.

The method in (2) refers to a method involving applying an organic coating solution in which a pigment is dispersed or dissolved to the plastic lens without directly dyeing the plastic lens material, and then curing it in order to form a dyed coating layer on the lens surface, or amethod involving adopting the method in (1) after forming a coating layer capable of being dyed on the surface of the plastic lens, that is, immersing the plastic lens in a dye solution, and heating for dyeing.

The method in (3) refers to a method for dissolving a dye in a raw material monomer of the plastic lens in advance, and then performing polymerization. The pigment in use is not particularly limited as long as it is capable of being homogeneously dissolved in a raw material monomer, or dispersed to the extent that the optical property is not damaged.

As for the method in (4), there are (a) a method involving the sublimation of a solid sublimation pigment for dyeing the plastic lens, (b) a method involving putting a base obtained by applying a solution containing a sublimation pigment opposite to the plastic lens at a non-contact state, and heating the base and the lens for dyeing, and (c) a method involving transferring a transfer layer composed of a coloring layer containing a sublimation pigment and an adhesive layer onto the plastic lens and then heating for dyeing. The optical lens of the present invention may be dyed by any of these methods. The pigment in use is not particularly limited as long as it is a pigment with a sublimation property.

EXAMPLES

The present invention is now illustrated in more detail below with reference to Examples. However, the present invention is not limited to these Examples.

The tests of the viscosity of composition after keeping it at 20 degrees C. for 5 hours, the transparency of the resin, the performances (refractive index, Abbe number, and heat resistance) of the lens were evaluated by the following testing methods.

Viscosity: The polymerizable composition comprising polyiso(thio)cyanates, thiol compounds, catalysts and additives was kept at 20 degrees C. for 5 hours, and then its viscosity (mPa·s) was measured by using a B-type viscometer. The process is usually conducted at 25 degrees C. or lower from the mixing of the polymerization composition to the injection into a mold. If the viscosity of the polymerization composition is too high, optical distortion, and the like occur in the obtained resin after injecting the polymerization composition into the mold, and thus it is not preferable. Accordingly, the lower the viscosity of the polymerization composition is after keeping it at 20 degrees C. for 5 hours, the further it is possible to increase the pot life, and operability is good.

Transparency of resin: The obtained resin was irradiated using a projector in a dark place, and the existence of clouding of the lens and non-transparent lens substance was visually determined. ○ indicates lenses without any clouding of the lens or non-transparent substance (with transparency), while x indicates those with clouding of the lens or non-transparent substance (no transparency).

Refractive index (ne) and Abbe number (ve): Measured at 20 degrees C. using a Pulfrich refractometer.

Heat resistance: Tg (degrees C) of the TMA penetration method (load: 50 g, pinpoint: 0.5 mmφ, temperature elevation rate: 10 degrees C./min) was measured as heat resistance.

Color: Using a calorimeter (CR-200) manufactured by Minolta, a resin color YI value was measured. The resin color YI value was measured by preparing a circular flat plate having a thickness of 9 mm with a size of φ 75 mm.

Example 1

15.0 g (27.8 mmol) of a solution of tri-n-octyl methyl ammonium chloride in isopropyl alcohol (containing IPA 25%) and 1.0 g (10.4 mmol) of methanesulfonic acid (manufactured by Tokyo Chemical Industry Co., Ltd.) were mixed to obtain a polymerization catalyst 1 as a pale yellow transparent liquid.

Example 2

10.0 g (18.6 mmol) of a solution of tri-n-octyl methyl ammonium chloride in isopropyl alcohol (containing IPA 25%) and 1.0 g (10.4 mmol) of methanesulfonic acid (manufactured by Tokyo Chemical Industry Co., Ltd.) were mixed to obtain a polymerization catalyst 2 as a pale yellow transparent liquid.

Example 3

7.5 g (13.9 mmol) of a solution of tri-n-octyl methyl ammonium chloride in isopropyl alcohol (containing IPA 25%) and 1.0 g (10.4 mmol) of methanesulfonic acid (manufactured by Tokyo Chemical Industry Co., Ltd.) were mixed to obtain a polymerization catalyst 3 as a pale yellow transparent liquid.

Example 4

0.140 g (2000 ppm based on the total weight of the polymerizable composition) of the polymerization catalyst 1 obtained in Example 1, 0.070 g of an internal mold release agent (STEPAN Company, product name: Zelec UN), and 0.035 g of an ultraviolet absorber (Kyodo Chemical Co., Ltd., product name: Biosorb 583) were mixed and dissolved in 36.4 g of m-xylylene diisocyanate at 20 degrees C. under a nitrogen atmosphere to give a homogeneous solution. The homogeneous solution was added to a mixed solution of 33.6 g of 4-mercaptomethyl-1,8-dimercapto-3,6-dithiaoctane, and the mixture was mixed and dissolved at 20 degrees C. under a nitrogen atmosphere. This mixed solution was defoamed under 400 Pa for 1 hour, and then filtered through a 1-µm PTFE filter. Then, the resulting solution was injected into a mold equipped with a glass mold and tapes. This mold was put into a polymerization oven, and then gradually heated from 25 degrees C. to 120 degrees C. for 21 hours to conduct polymerization. After completion of the polymerization, the mold was taken out from the oven, and the resin was released from the mold. The obtained resin was additionally annealed at 130 degrees C. for 4 hours. The obtained resin had transparency. Furthermore, it had a refractive index (ne) of 1.664, an Abbe number (ve) of 31.2, a heat resistance (Tg) of 88.0 degrees C., and a color phase of 4.9, and thus, it was suitable as an optical transparent resin. The viscosity of the polymerizable composition measured after keeping it at 20 degrees C for 5 hours was 32 mPa·s. The evaluation results are shown in Table 1.

Example 5

0.140 g (2000 ppm based on the total weight of the polymerizable composition) of the polymerization catalyst 2 obtained in Example 2, 0.070 g of an internal mold release agent (STEPAN Company, product name: Zelec UN), and 0.035 g of an ultraviolet absorber (Kyodo Chemical Co., Ltd., product name: Biosorb 583) were mixed and dissolved in 36.4 g of m-xylylene diisocyanate at 20 degrees C. under a nitrogen atmosphere to give a homogeneous solution. The homogeneous solution was added to a mixed solution of 33.6 g of 4-mercaptomethyl-1,8-dimercapto-3,6-dithiaoctane, and the mixture was mixed and dissolved at 20 degrees C. under a nitrogen atmosphere. This mixed solution was defoamed under 400 Pa for 1 hour, and then filtered through a 1-µm PTFE filter. Then, the resulting solution was injected into a mold equipped with a glass mold and tapes. This mold was put into a polymerization oven, and then gradually heated from 25 degrees C. to 120 degrees C. for 21 hours to conduct polymerization. After completion of the polymerization, the mold was taken out from the oven, and the resin was released from the mold. The obtained resin was additionally annealed at 130 degrees C. for 4 hours. The obtained resin had transparency. Furthermore, it had a refractive index (ne) of 1.664, an Abbe number (ve) of 31.2, a heat resistance (Tg) of 88.6 degrees C., and a color phase of 5.1, and thus, it was suitable as an optical transparent resin. The viscosity of the polymerizable composition measured after keeping it at 20 degrees C for 5 hours was 26 mPa·s. The evaluation results are shown in Table 1.

Example 6

0.175 g of tetrabutylammonium P-toluenesulfonate (Aldrich Corp., 2500 ppm based on the total weight of the polymerizable composition), 0.070 g of an internal mold release agent (STEPAN Company, product name: Zelec UN), and 0.035 g of an ultraviolet absorber (Kyodo Chemical Co., Ltd., product name: Biosorb 583) were mixed and dissolved in 36.4 g of m-xylylene diisocyanate at 20 degrees C. under a nitrogen atmosphere to give a homogeneous solution. The homogeneous solution was added to a mixed solution of 33.6 g of 4-mercaptomethyl-1,8-dimercapto-3,6-dithiaoctane, and the mixture was mixed and dissolved at 20 degrees C. under a nitrogen atmosphere. This mixed solution was defoamed under 400 Pa for 1 hour, and then filtered through a 1-µm PTFE filter. Then, the resulting solution was injected into a mold equipped with a glass mold and tapes. This mold was put into a polymerization oven, and then gradually heated from 25 degrees C. to 120 degrees C. for 21 hours to conduct polymerization. After completion of the polymerization, the mold was taken out from the oven, and the resin was released from the mold. The obtained resin was additionally annealed at 130 degrees C. for 4 hours. The obtained resin had transparency. Furthermore, it had a refractive index (ne) of 1.664, an Abbe number (ve) of 31.5, a heat resistance (Tg) of 87.9 degrees C., and a color phase of 5.7, and thus, it was suitable as an optical transparent resin. The viscosity of the polymerizable composition measured after keeping it at 20 degrees C. for 5 hours was 27 mPa·s. The evaluation results are shown in Table 1.

Example 7

0.280 g (4000 ppm based on the total weight of the polymerizable composition) of the polymerization catalyst 2 obtained in Example 2, 0.088 g of an internal mold release agent (STEPAN Company, product name: Zelec UN), and 0.035 g (500 ppm based on the total weight of the polymerizable composition) of an ultraviolet absorber (Kyodo Chemical Co., Ltd., product name: Biosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degrees C. under a nitrogen atmosphere to give a homogeneous solution. The homogeneous solution was added to a mixed solution of 16.7 g of pentaerythritoltetrakis(3-mercaptopropionate) and 17.9 g of 4-mercaptomethyl-1,8-dimercapto-3,6-dithiaoctane, and the mixture was mixed and dissolved at 20 degrees C. under a nitrogen atmosphere. This mixed solution was defoamed under 400 Pa for 1 hour, and then filtered through a 1-µm PTFE filter. Then, the resulting solution was injected into a mold equipped with a glass mold and tapes. This mold was put into a polymerization oven, and then gradually heated from 25 degrees C. to 130 degrees C. for 21 hours to conduct polymerization. After completion of the polymerization, the mold was taken out from the oven, and the resin was released from the mold. The obtained resin was additionally annealed at 130 degrees C. for 2 hours. The obtained resin had transparency. Furthermore, it had a refractive index (ne) of 1.597, an Abbe number (ve) of 40.2, a heat resistance (Tg) of 119.0 degrees C., and a color phase of 3.9, and thus, it was suitable as an optical transparent resin. The viscosity of the polymerizable composition measured after keeping at 20 degrees C. for 5 hours was 40 mPa·s. The evaluation results are shown in Table 1.

Example 8

0.280 g (4000 ppm based on the total weight of the polymerizable composition) of the polymerization catalyst 3 obtained in Example 3, 0.088 g of an internal mold release agent (STEPAN Company, product name: Zelec UN), and 0.035 g (500 ppm based on the total weight of the polymerizable composition) of an ultraviolet absorber (Kyodo Chemical Co., Ltd., product name: Biosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degrees C. under a nitrogen atmosphere to give a homogeneous solution. The homogeneous solution was added to a mixed solution of 16.7 g of pentaerythritoltetrakis(3-mercaptopropionate) and 17.9 g of 4-mercaptomethyl-1,8-dimercapto-3,6-dithiaoctane, and the mixture was mixed and dissolved at 20 degrees C. under a nitrogen atmosphere. This mixed solution was defoamed under 400 Pa for 1 hour, and then filtered through a 1-μm PTFE filter. Then, the resulting solution was injected into a mold equipped with a glass mold and tapes. This mold was put into a polymerization oven, and then gradually heated from 25 degrees C. to 130 degrees C. for 21 hours to conduct polymerization. After completion of the polymerization, the mold was taken out from the oven, and the resin was released from the mold. The obtained resin was additionally annealed at 130 degrees C. for 2 hours. The obtained resin had transparency. Furthermore, it had a refractive index (ne) of 1.597, an Abbe number (ve) of 40.4, a heat resistance (Tg) of 119.5 degrees C., and a color phase of 4.1, and thus, it was suitable as an optical transparent resin. The viscosity of the polymerizable composition measured after keeping it at 20 degrees C. for 5 hours was 38 mPa·s. The evaluation results are shown in Table 1.

Example 9

0.140 g of tetrabutylammonium p-toluenesulfonate (Aldrich Corp., 2000 ppm based on the total weight of the polymerizable composition), 0.084 g of an internal mold release agent (STEPAN Company, product name: Zelec UN), and 0.035 g (500 ppm based on the total weight of the polymerizable composition) of an ultraviolet absorber (Kyodo Chemical Co., Ltd., product name: Biosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degrees C. under a nitrogen atmosphere to give a homogeneous solution. The homogeneous solution was added to a mixed solution of 16.7 g of pentaerythritoltetrakis(3-mercaptopropionate) and 17.9 g of 4-mercaptomethyl-1,8-dimercapto-3,6-dithiaoctane, and the mixture was mixed and dissolved at 20 degrees C. under a nitrogen atmosphere. This mixed solution was defoamed under 400 Pa for 1 hour, and then filtered through a 1-μm PTFE filter. Then, the resulting solution was injected into a mold equipped with a glass mold and tapes. This mold was put into a polymerization oven, and then gradually heated from 25 degrees C. to 130 degrees C. for 21 hours to conduct polymerization. After completion of the polymerization, the mold was taken out from the oven, and the resin was released from the mold. The obtained resin was additionally annealed at 130 degrees C. for 2 hours. The obtained resin had transparency. Furthermore, it had a refractive index (ne) of 1.598, an Abbe number (ve) of 40.7, a heat resistance (Tg) of 119.3 degrees C., and a color phase of 4.3, and thus, it was suitable as an optical transparent resin. The viscosity of the polymerizable composition measured after keeping it at 20 degrees C. for 5 hours was 23 mPa·s. The evaluation results are shown in Table 1.

Example 10

0.140 g (2000 ppm based on the total weight of the polymerizable composition) of the polymerization catalyst 1 obtained in Example 1, 0.070 g of an internal mold release agent (STEPAN Company, product name: Zelec UN), and 0.035 g of an ultraviolet absorber (Kyodo Chemical Co., Ltd., product name: Biosorb 583) were mixed and dissolved in 35.5 g of m-xylylene diisocyanate at 20 degrees C. under a nitrogen atmosphere to give a homogeneous solution. To this homogeneous solution was added a mixed solution containing 34.5 g of 4,8-bis(mercaptomethyl)-3,6,9-trithia-1,11-undecanedithiol mixture, and the mixture was mixed and dissolved at 20 degrees C. under a nitrogen atmosphere. This mixed solution was defoamed under 400 Pa for 1 hour, and then filtered through a 1-μm PTFE filter. Then, the resulting solution was injected into a mold equipped with a glass mold and tapes. This mold was put into a polymerization oven, and then gradually heated from 25 degrees C. to 120 degrees C. for 21 hours to conduct polymerization. After completion of the polymerization, the mold was taken out from the oven, and the resin was released from the mold. The obtained resin was additionally annealed at 130 degrees C. for 4 hours. The obtained resin had transparency. Furthermore, it had a refractive index (ne) of 1.668, an Abbe number (ve) of 31.4, a heat resistance (Tg) of 104.8 degrees C., and a color phase of 5.0, and thus, it was suitable as an optical transparent resin. The viscosity of the polymerizable composition measured after keeping it at 20 degrees C. for 5 hours was 60 mPa·s. The evaluation results are shown in Table 1.

Comparative Example 1

0.0105 g (150 ppm based on the total weight of the polymerizable composition) of di-n-butyltin dichloride, 0.070 g of an internal mold release agent (STEPAN Company, product name: Zelec UN), and 0.035 g of an ultraviolet absorber (Kyodo Chemical Co., Ltd., product name: Biosorb 583) were mixed and dissolved in 36.4 g of m-xylylene diisocyanate at 20 degrees C. under a nitrogen atmosphere to give a homogeneous solution. To this homogeneous solution was added a mixed solution containing 33.6 g of 4-mercaptomethyl-1,8-dimercapto-3,6-dithiaoctane, and the mixture was mixed and dissolved at 20 degrees C. under a nitrogen atmosphere. This mixed solution was defoamed under 400 Pa for 1 hour, and then filtered through a 1-μm PTFE filter. Then, the resulting solution was injected into a mold equipped with a glass mold and tapes. This mold was put into a polymerization oven, and then gradually heated from 25 degrees C. to 120 degrees C. for 21 hours to conduct polymerization. After completion of the polymerization, the mold was taken out from the oven, and the resin was released from the mold. The obtained resin was additionally annealed at 130 degrees C. for 4 hours. The obtained resin had transparency. Furthermore, it had a refractive index (ne) of 1.665, an Abbe number (ve) of 31.3, a heat resistance (Tg) of 88.2 degrees C., and a color phase of 5.4, and thus, it was suitable as an optical transparent resin. The viscosity of the polymerizable composition measured after keeping it at 20 degrees C. for 5 hours was 78 mPa·s. The evaluation results are shown in Table 1.

Comparative Example 2

0.014 g (200 ppm based on the total weight of the polymerizable composition) of di-n-butyltin dichloride, 0.084 g of an internal mold release agent (STEPAN Company, product name: Zelec UN), and 0.035 g of an ultraviolet absorber (Kyodo Chemical Co., Ltd., product name: Biosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degrees C. under a nitrogen atmosphere to give a homogeneous solution. The homogeneous solution was added to a mixed solution of 16.7 g of pentaerythritoltetrakis(3-mercaptopropionate) and 17.9 g of 4-mercaptomethyl-1,8-dimercapto-3,6-dithiaoctane and the mixture was mixed and dissolved at 20 degrees C. under a nitrogen atmosphere. This mixed solution was defoamed under 400 Pa for 1 hour, and then filtered through a 1-μm PTFE filter. Then, the resulting solution was injected into a mold equipped with a glass mold and tapes. This mold was put into a polymerization oven, and then gradually heated from 25 degrees C. to 120 degrees C. for 21 hours to conduct polymerization. After completion of the polymerization, the mold was taken out from the oven, and the resin was released from the mold. The obtained resin was additionally annealed at 130 degrees C. for 4 hours. The obtained resin had transparency. Furthermore, it had a refractive index (ne) of 1.597, an Abbe number (ve) of 40.4, a heat resistance (Tg) of 117.7 degrees C., and a color phase of 3.8, and thus, it was suitable as an optical transparent resin. The viscosity of the polymerizable composition measured after keeping it at 20 degrees C. for 5 hours was 46 mPa·s. The evaluation results are shown in Table 1.

Comparative Example 3

0.0070 g (100 ppm based on the total weight of the polymerizable composition) of di-n-butyltin dichloride, 0.070 g of an internal mold release agent (STEPAN Company, product name: Zelec UN), and 0.035 g of an ultraviolet absorber (Kyodo Chemical Co., Ltd., product name: Biosorb 583) were mixed and dissolved in 35.5 g of m-xylylene diisocyanate at 20 degrees C. under a nitrogen atmosphere to give a homogeneous solution. To this homogeneous solution was added 34.5 g of a mixed solution of 4,8-bis(mercaptomethyl)-3,6,9-trithia-1,11-undecanedithiol mixture, and the mixture was mixed and dissolved at 20 degrees C. under a nitrogen atmosphere. This mixed solution was defoamed under 400 Pa for 1 hour, and then filtered through a 1-μm PTFE filter. Then, the resulting solution was injected into a mold equipped with a glass mold and tapes. This mold was put into a polymerization oven, and then gradually heated from 25 degrees C. to 120 degrees C. for 21 hours to conduct polymerization. After completion of the polymerization, the mold was taken out from the oven, and the resin was released from the mold. The obtained resin was additionally annealed at 130 degrees C. for 4 hours. The obtained resin had transparency. Furthermore, it had a refractive index (ne) of 1.668, an Abbe number (ve) of 31.4, a heat resistance (Tg) of 102.6 degrees C., and a color phase of 5.0, and thus, it was suitable as an optical transparent resin. The viscosity of the polymerizable composition measured after keeping it at 20 degrees C. for 5 hours was 103 mPa·s. The evaluation results are shown in Table 1.

Comparative Example 4

0.070 g of triethylamine was added to 36.4 g of m-xylylene diisocyanate, which then turned yellow after 15 minutes, the precipitates were produced after 20 minutes, and then it solidified.

Comparative Example 5

0.0455 g (650 ppm based on the total weight of the polymerizable composition) of 1,8-diazabicyclo(5,4,0)-7-undeceneoctylate, 0.084 g of an internal mold release agent (STEPAN Company, product name: Zelec UN), and 0.035 g of an ultraviolet absorber (Kyodo Chemical Co., Ltd., product name: Biosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degrees C. under a nitrogen atmosphere to give a homogeneous solution. The homogeneous solution was added to a mixed solution of 16.7 g of pentaerythritoltetrakis(3-mercaptopropionate) and 17.9 g of 4-mercaptomethyl-1,8-dimercapto-3,6-dithiaoctane and the mixture was mixed and dissolved at 20 degrees C. under a nitrogen atmosphere. This mixed solution was defoamed under 400 Pa for 1 hour, and then filtered through a 1-μm PTFE filter. Then, the resulting solution was injected into a mold equipped with a glass mold and tapes. This mold was put into a polymerization oven, and then gradually heated from 25 degrees C. to 120 degrees C. for 21 hours to conduct polymerization. After completion of the polymerization, the mold was taken out from the oven, and the resin was released from the mold. The obtained resin was additionally annealed at 130 degrees C. for 4 hours. The obtained resin had transparency. Furthermore, it had a refractive index (ne) of 1.597, an Abbe number (ve) of 40.5, a heat resistance (Tg) of 105.2 degrees C., and a color phase of 3.7, and thus, sufficient heat resistance was not attained compared with the cases where conventional organotin catalysts are used. The evaluation results are shown in Table 1.

Comparative Example 6

0.280 g (4000 ppm based on the total weight of the polymerizable composition) of tri-n-octyl methyl ammonium chloride, 0.084 g of an internal mold release agent (STEPAN Company, product name: Zelec UN), and 0.035 g of an ultraviolet absorber (Kyodo Chemical Co., Ltd., product name: Biosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degrees C. under a nitrogen atmosphere to give a homogeneous solution. The homogeneous solution was added to a mixed solution of 16.7 g of pentaerythritoltetrakis(3-mercaptopropionate) and 17.9 g of 4-mercaptomethyl-1,8-dimercapto-3,6-dithiaoctane and the mixture was mixed and dissolved at 20 degrees C. under a nitrogen atmosphere. This mixed solution was defoamed under 400 Pa for 1 hour, and then filtered through a 1-μm PTFE filter. Then, the resulting solution was injected into a mold equipped with a glass mold and tapes. This mold was put into a polymerization oven, and then gradually heated from 25 degrees C. to 120 degrees C. for 21 hours to conduct polymerization. After completion of the polymerization, the mold was taken out from the oven, and the resin was released from the mold. The obtained resin was additionally annealed at 130 degrees C. for 4 hours. The obtained resin had transparency. Further, it had a refractive index (ne) of 1.596, an Abbe number (ve) of 40.8, a heat resistance (Tg) of 99.1 degrees C., and a color phase of 4.1, and thus, sufficient heat resistance was not attained compared with the cases where conventional organotin catalysts are used. The evaluation results are shown in Table 1.

TABLE 1

| | Isocyanates (g) | Active hydrogen compound (g) | Polymerization catalyst (ppm) note 1 | Viscosity increasing rate (mPa · s) (20° C., 5 Hr) | Refractive index (ne) | Abbe number (ve) | Heat resistance (° C.) | Color YI | Transparency |
|---|---|---|---|---|---|---|---|---|---|
| Example 4 | m-xylylene diisocyanate (36.4) | 4-mercaptomethyl-1,8-dimercapto-3,6-dithiaoctane (33.6) | Polymerization catalyst 1 (2000) | 32 | 1.664 | 31.2 | 88.0 | 4.9 | ○ |
| Example 5 | m-xylylene diisocyanate (36.4) | 4-mercaptomethyl-1,8-dimercapto-3,6-dithiaoctane (33.6) | Polymerization catalyst 2 (2000) | 26 | 1.664 | 31.2 | 88.6 | 5.1 | ○ |
| Example 6 | m-xylylene diisocyanate (36.4) | 4-mercaptomethyl-1,8-dimercapto-3,6-dithiaoctane (33.6) | TBAPTS (2500) | 27 | 1.664 | 31.5 | 87.9 | 5.7 | ○ |
| Example 7 | Mixture of 2,5-bis(isocyanatomethyl)-bicyclo[2.2.1]heptane and 2,6-bis(isocyanatomethyl)-bicyclo[2.2.1]heptane (35.4) | 4-mercaptomethyl-1,8-dimercapto-3,6-dithiaoctane (17.9) Pentaerythritoltetrakis(3-mercaptopropionate) (16.7), | Polymerization catalyst 2 (4000) | 40 | 1.597 | 40.2 | 119.0 | 3.9 | ○ |
| Example 8 | Mixture of 2,5-bis(isocyanatomethyl)-bicyclo[2.2.1]heptane and 2,6-bis(isocyanatomethyl)-bicyclo[2.2.1]heptane (35.4) | 4-mercaptomethyl-1,8-dimercapto-3,6-dithiaoctane (17.9) Pentaerythritoltetrakis(3-mercaptopropionate) (16.7) | Polymerization catalyst 3 (4000) | 38 | 1.597 | 40.4 | 119.5 | 4.1 | ○ |
| Example 9 | Mixture of 2,5-bis(isocyanatomethyl)-bicyclo[2.2.1]heptane and 2,6-bis(isocyanatomethyl)-bicyclo[2.2.1]heptane (35.4) | 4-mercaptomethyl-1,8-dimercapto-3,6-dithiaoctane (17.9) Pentaerythritoltetrakis(3-mercaptopropionate) (16.7) | TBAPTS (2000) | 23 | 1.598 | 40.7 | 119.3 | 4.3 | ○ |
| Example 10 | m-xylylene diisocyanate (35.5) | 4,8-bis(mercaptomethyl)-3,6,9-trithia-1,11-undecanedithiol mixture (34.5) | Polymerization catalyst 1 (2000) | 60 | 1.668 | 31.4 | 104.8 | 5.0 | ○ |
| Comparative Example 1 | m-xylylene diisocyanate (36.4) | 4-mercaptomethyl-1,8-dimercapto-3,6-dithiaoctane (33.6) | DBC (150) | 78 | 1.665 | 31.3 | 88.2 | 5.4 | ○ |
| Comparative Example 2 | Mixture of 2,5-bis(isocyanatomethyl)-bicyclo[2.2.1]heptane and 2,6-bis(isocyanatomethyl)-bicyclo[2.2.1]heptane (35.4) | 4-mercaptomethyl-1,8-dimercapto-3,6-dithiaoctane (17.9) Pentaerythritoltetrakis(3-mercaptopropionate) (16.7) | DBC (200) | 46 | 1.597 | 40.4 | 117.7 | 3.8 | ○ |
| Comparative Example 3 | m-xylylene diisocyanate (35.5) | 4,8-bis(mercaptomethyl)-3,6,9-trithia-1,11-undecanedithiol mixture (34.5) | DBC (100) | 103 | 1.668 | 31.4 | 102.6 | 5.0 | ○ |
| Comparative Example 5 | Mixture of 2,5-bis(isocyanatomethyl)-bicyclo[2.2.1]heptane and 2,6-bis(isocyanatomethyl)-bicyclo[2.2.1]heptane (35.4) | 4-mercaptomethyl-1,8-dimercapto-3,6-dithiaoctane (17.9) Pentaerythritoltetrakis(3-mercaptopropionate) (16.7) | DBUOA (650) | — | 1.597 | 40.5 | 105.2 | 3.7 | ○ |

TABLE 1-continued

| | Isocyanates (g) | Active hydrogen compound (g) | Polymerization catalyst (ppm)note 1 | Viscosity increasing rate (mPa·s) (20° C., 5 Hr) | Refractive index (ne) | Abbe number (ve) | Heat resistance (° C.) | Color YI | Transparency |
|---|---|---|---|---|---|---|---|---|---|
| Comparative Example 6 | Mixture of 2,5-bis(isocyanatomethyl)-bicyclo [2.2.1]heptane and 2,6-bis(isocyanatomethyl)-bicyclo [2.2.1]heptane (35.4) | 4-mercaptomethyl-1,8-dimercapto-3,6-dithiaoctane (17.9) Pentaerythritoltetrakis (3-mercaptopropionate) (16.7) | TOMAC (4000) | — | 1.596 | 40.8 | 99.1 | 4.1 | ○ |

Note 1
The amount of the polymerization catalyst to be added (ppm) is a value based on the total weight of the polymerization composition.
TBAPTS: Tetrabutylammonium p-toluenesulfonate,
DBC: Di-n-butyltin dichloride,
DBUOA: 1,8-diazabicyclo-(5,4,0)-7-undeceneoctylate,
TOMAC: Tri-n-octyl methyl ammonium chloride In Examples 4, 5, and 6, qualities of the resin such as heat resistance were equivalent, in comparison to the di-n-butyltin dichloride catalyst of Comparative Example 1, and a resin suitable as an optical material was obtained on completion of the polymerization. The viscosity of the polymerizable composition after keeping it at 20 degrees C. for 5 hours was lower than that of Comparative Example 1, and the pot life could be increased.

In Examples 7, 8, and 9, the heat resistance was high, and the other qualities of the resin were equivalent, in comparison to the di-n-butyltin dichloride catalyst of Comparative Example 2, and a resin suitable as an optical material was obtained on completion of the polymerization. The viscosity of the polymerizable composition after keeping it at 20 degrees C. for 5 hours was lower than that of Comparative Example 1, and the pot life could be increased. Furthermore, in Comparative Examples 5 and 6, other non-metallic polymerization catalysts were used to conduct polymerization, but sufficient heat resistance was not obtained, as compared with Examples 5 and 6 using the catalyst of the present Example, and Comparative Example 2 using the conventional organotin catalyst, and the polymerization was not completed.

In Example 10, the heat resistance was high, and the other qualities of the resin were equivalent, in comparison to the di-n-butyltin dichloride catalyst of Comparative Example 3, and a resin suitable as an optical material was obtained on completion of the polymerization. Furthermore, the viscosity of the polymerizable composition after keeping it at 20 degrees C. for 5 hours was lower than that of Comparative Example 7, and the pot life could be increased.

INDUSTRIAL APPLICABILITY

The catalyst of the present invention is a tin-free catalyst having an excellent catalytic activity capable of replacing an organotin catalyst that has been conventionally used as a catalyst for the preparation of a polythiourethane-based optical material. The catalyst of the present invention is useful as a novel catalyst to replace the organotin catalyst, the regulation of use of which has been strengthened in recent years. The catalyst of the present invention allows the pot life to be greatly increased even without any cooling of the monomer mixture, since the activity at a low temperature is particularly low, and the increase in the viscosity of a monomer mixture until injection into a mold is slow, in comparison to the organotin catalyst. Furthermore, the polythiourethane resin obtained by the catalyst of the present invention sufficiently satisfies the physical properties necessary for an optical material, and accordingly, the catalyst of the present invention is useful as an excellent non-metal catalyst to replace the organotin-based catalysts.

The polythiourethane-based optical materials of the present invention, obtained by using the polythiourethane resin, are used for optical materials in plastic lenses, prisms, optical fibers, information recording substrates, filters, light emitting diodes, and the like, and are particularly suitable for use as plastic lens materials for spectacles.

The invention claimed is:

1. A polymerizable composition for a polythiourethane-based optical material comprising a monomer mixture including polyiso(thio)cyanates and active hydrogen compounds with a molar ratio of the functional groups of the iso(thio)cyanato groups contained in said polyiso(thio)cyanates to the mercapto groups contained in said active hydrogen compounds in a range of 0.5 to 3.0, and a polymerization catalyst for a polythiourethane-based optical material comprising a sulfonate represented by the formula (1), in a content of 0.005 parts by weight to 2 parts by weight, based on 100 parts by weight of said monomer mixture:

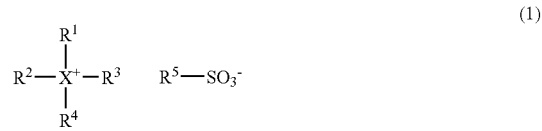

(1)

wherein $R^1$, $R^2$, $R^3$ and $R^4$ each independently represent an alkyl group having 1 to 18 carbon atoms, and $R^1$, $R^2$, $R^3$ and $R^4$ may be bonded to each other to form a ring, and wherein $R^5$ represents a methyl group or tolyl group, and X represents a nitrogen atom, wherein the polymerization catalyst contained in the polymerization composition consists of the sulfonate represented by the formula (1), wherein said polyiso(thio)cyanates are one or more selected from the group consisting of m-xylylene diisocyanate, 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane, and hexamethylene diisocyanate, and said active hydrogen compounds are one or more selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane, and 2-(2,2-bis(mercaptomethylthio)ethyl)-1,3-dithiethane.

2. A polythiourethane-based optical material obtained by heat curing the polymerizable composition for a polythiourethane-based optical material as claimed in claim 1 at a temperature of −50 to 200 degrees C. for 1 to 100 hours.

3. A plastic lens comprising the polythiourethane-based optical material as claimed in claim 2.

* * * * *